US007804608B2

(12) United States Patent  
Shirai et al.

(10) Patent No.: US 7,804,608 B2
(45) Date of Patent: Sep. 28, 2010

(54) INFORMATION PROCESSING APPARATUS, INFORMATION PROCESSING METHOD, PROGRAM, AND COMPUTER-READABLE STORAGE MEDIUM

(75) Inventors: Kenichi Shirai, Kanagawa (JP); Noriyoshi Kurotsu, Kanagawa (JP); Masamichi Ohshima, Tokyo (JP); Hidekazu Morooka, Kanagawa (JP); Takashi Yagita, Kanagawa (JP); Koichiro Wanda, Kanagawa (JP); Koji Kikuchi, Kanagawa (JP); Kei Kitagata, Kanagawa (JP); Hiroyuki Kayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1164 days.

(21) Appl. No.: 10/894,018

(22) Filed: Jul. 20, 2004

(65) Prior Publication Data

US 2005/0018236 A1 Jan. 27, 2005

(30) Foreign Application Priority Data

Jul. 25, 2003 (JP) ............................. 2003-201930

(51) Int. Cl.
 *G06F 3/12* (2006.01)
 *G06F 15/00* (2006.01)
 *G06F 3/00* (2006.01)
 *G06K 15/00* (2006.01)

(52) U.S. Cl. .................... 358/1.15; 358/1.13; 358/1.14; 358/1.16; 358/1.18; 710/17

(58) Field of Classification Search ............... 358/1.15, 358/1.14, 1.13, 1.16, 1.18, 401, 434, 444; 710/17; 719/321
See application file for complete search history.

(56) References Cited

U.S. PATENT DOCUMENTS

| 6,453,268 | B1 | 9/2002 | Carney et al. ............... 702/186 |
| 6,618,163 | B1 * | 9/2003 | Roosen et al. ............. 358/1.15 |
| 6,709,176 | B2 | 3/2004 | Gotoh et al. ................. 400/61 |

(Continued)

FOREIGN PATENT DOCUMENTS

DE 100 51 022 6/2001

(Continued)

OTHER PUBLICATIONS

Japanese Office Action dated Jun. 12, 2006 for Japanese Patent Application No. 2003-201930.

*Primary Examiner*—Edward L Coles
*Assistant Examiner*—Neil R McLean
(74) *Attorney, Agent, or Firm*—Fitzpatrick, Cella, Harper & Scinto

(57) ABSTRACT

There are provided an information processing apparatus and information processing method, which can implement a job or printer device monitoring scheme that allows the user to easily detect status of printing apparatus in advance. The status of a physical printer device corresponding to a predetermined logical printer, which is set as an object to be monitored, is monitored, and a result based on monitoring is displayed on a computer display as a resident display. For example, when the resident display is displayed as an icon on the task tray on the computer display, it does not disturb display of windows of other document creation applications. Also, the user need not purposely instruct to launch a monitor utility upon printing. Hence, a job or printer device monitoring scheme which is very convenient for the user can be implemented.

25 Claims, 20 Drawing Sheets

U.S. PATENT DOCUMENTS

| | | | | |
|---|---|---|---|---|
| 7,016,060 | B1 | 3/2006 | Carney et al. | 358/1.15 |
| 2002/0054320 | A1* | 5/2002 | Ogino | 358/1.15 |
| 2002/0089692 | A1* | 7/2002 | Ferlitsch | 358/1.15 |
| 2002/0105671 | A1* | 8/2002 | Sugahara | 358/1.15 |
| 2003/0098993 | A1 | 5/2003 | Ohara | 358/1.15 |
| 2004/0004734 | A1* | 1/2004 | Brown et al. | 358/1.14 |
| 2004/0080779 | A1 | 4/2004 | Kawamoto | 358/1.14 |

FOREIGN PATENT DOCUMENTS

| | | |
|---|---|---|
| EP | 0 943 987 | 9/1999 |
| JP | 7-104951 A | 4/1995 |
| JP | 11-327856 A | 11/1999 |
| JP | 2001-309104 A | 11/2001 |
| JP | 2002-149388 A | 5/2002 |

* cited by examiner

FIG. 14

| OPERATION | RESULT |
|---|---|
| DOUBLE-CLICKING OF MOUSE | DISPLAY STATUS DISPLAY DIALOG |
| RIGHT CLICKING OF MOUSE | DISPLAY POPUP MENU HAVING ITEMS :<br>· DISPLAY PRINTER LIST<br>· INDIVIDUAL PRINTER<br>· DISPLAY JOB LIST<br>· DISPLAY PRINT/TRANSMISSION JOB HISTORY<br>· DISPLAY FAX RECEPTION JOB HISTORY<br>· PROPERTY<br>· HELP<br>· VERSION INFORMATION<br>· QUIT PRINT MANAGER |
| LEFT CLICKING OF MOUSE | START STATUS MONITORING OF DEFAULT PRINTER |
| SUPERPOSE MOUSE CURSOR | TOOLTIP DISPLAY<br>NON-MONITORING : PRINTER NAME<br>DURING MONITORING : PRINTER NAME + STATUS<br>PRINTER NOT TO BE MONITORED : PRINTER NAME + "NOT PRINTER TO BE MONITORED" |

FIG. 15A

| | | |
|---|---|---|
| 1501 | ○ | NON-MONITOR STATE |
| 1502 | ★ | MANUAL FEED |
| 1503 | ☆ | MANUAL FEED/CONGESTION |
| 1504 | ◎ | PRINTABLE |
| 1505 | (icon) | PRINTABLE/CONGESTION |
| 1506 | ⦿ | WARNING |
| 1507 | (icon) | WARNING/CONGESTION |
| 1508 | O | ERROR |
| 1509 | (icon) | ERROR/CONGESTION |
| 1510 | ⊘ | STATUS ACQUISITION IN PROGRESS |
| 1511 | ? | PRINTER NOT TO BE MONITORED |

FIG. 15B

MY JOB STATUS MONITOR ICON

| | | |
|---|---|---|
| 1512 | 📄 | BEFORE COMPLETION OF TRANSFER |
| 1513 | 📄 | AFTER COMPLETION OF TRANSFER UNTIL END OF PROCESS |
| 1514 | 📄 | JOB ERROR/UNKNOWN |
| 1515 | 📄 | JOB SUSPENDED |

SELECTIVELY DISPLAY ABOVE ICONS

FIG. 15C

| STATUS | STATUS OF QUEUE/PORT/DEVICE |
|---|---|
| MANUAL FEED (★) | • MANUAL FEED |
| MANUAL FEED/CONGESTION (☆) | |
| PRINTABLE (◎) | • NORMAL |
| PRINTABLE/CONGESTION (icon) | |
| WARNING (⦿) | • WARNING |
| WARNING/CONGESTION (icon) | • INFORMATION (DURING WARMING-UP/LIBRATION/SLEEP)<br>• OFFLINE<br>• PRINTER SUSPENDED |
| ERROR (O) | • DEVICE OPERATOR CALL ERROR |
| ERROR/CONGESTION (icon) | • DEVICE SERVICE CALL ERROR<br>• PORT ERROR<br>• PORT SUSPENDED |

INFORMATION PROCESSING APPARATUS, INFORMATION PROCESSING METHOD, PROGRAM, AND COMPUTER-READABLE STORAGE MEDIUM

CLAIM OF PRIORITY

This application claims priority from Japanese Patent Application No. 2003-201930 filed on Jul. 25, 2003 which is hereby incorporated by reference herein.

FIELD OF THE INVENTION

The present invention relates to an information processing apparatus and information processing method, which monitor printer status and, more particularly, to an information processing apparatus and information processing method, which monitor the status of a printer connected to a network, and execute various processes on the basis of the monitoring result.

BACKGROUND OF THE INVENTION

In recent years, there has prevailed a print environment in which the user selects a desired one of a plurality of printers connected in a network environment, and issues a print request.

In such network environment, various printer devices, and many monitor utilities which monitor the status of jobs in each printer device and that of the printer devices in a host computer are known. Also, a monitor utility that utilizes a browser or the like is known.

Normally, such utility runs when the user launches a utility application with an intent to do so or when the utility is automatically launched in response to a document print request, as disclosed in Japanese Patent Laid-Open No. 2002-149388.

Also, as disclosed in Japanese Patent Laid-Open No. 07-104951, the status of a printer device is often reflected on an icon on a desktop. According to this reference, the status data of a plurality of printers are graphically displayed using icons, and the user can issue a sleep start instruction or sleep cancel instruction to these icons via a mouse.

However, with the conventional monitor utilities of jobs and printer devices disclosed in Japanese Patent Laid-Open Nos. 2002-149388 and 07-104951, every time the user wants to detect the status data of jobs and devices, he or she must launch such monitor utility application, resulting in troublesome operations.

When the monitor utility runs all the time, it may partially conceal display of another application window (e.g., a document processing application) on a limited display unit.

Furthermore, when the monitor utility runs all the time, it may increase not only the network load but also the processing load on a computer.

Furthermore, according to the utilities that monitor the status of a plurality of printer devices disclosed in Japanese Patent Laid-Open Nos. 2002-149388 and 07-104951, there is a merit, i.e., the status of the plurality of printers can be recognized. However, the user most frequently uses a printer which is set as a default in the operating system in actual print jobs, and a scheme that allows the user to efficiently detect various status data in a printer which is used most frequently is demanded. Especially, in a print environment in a business environment, a plurality of logical printers are often registered in a predetermined client, and a scheme that allows the user to efficiently detect information associated with a default printer from these printers is required.

When the monitor utility is automatically launched to monitor the status of jobs and devices in response to a document print request, the user can recognize that the device suffers a paper jam or out-of-paper state. However, the user has already issued the print request in such state, and must re-issue a print request to another printer, resulting in inefficient print jobs.

SUMMARY OF THE INVENTION

The present invention has been made to solve the aforementioned problems individually or together, and has as its object to provide an information processing apparatus and information processing method, which implement a job or printer device monitor scheme that allows the user to easily detect the status of a printer device in advance.

According to one aspect of the present invention, preferably, a computer program product which has a program code for operating an information processing apparatus with a print processing function and is stored in a computer-readable memory, comprises:

program code for executing a default printer specifying step of specifying a default printer which is set to be used as a default in an operating system;

program code for executing a monitoring step of monitoring status of the specified default printer; and program code for executing a control step of controlling to display a result based on monitoring in the monitoring step on a display unit as a resident display.

According to another aspect of the present invention, preferably, an information processing method for an information processing apparatus with a print processing function, comprises:

a default printer specifying step of specifying a default printer which is set to be used as a default in an operating system;

a monitoring step of monitoring status of the specified default printer; and a control step of controlling to display a result based on monitoring in the monitoring step on a display unit as a resident display.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention, in which:

FIG. 14 is a table showing user's operations supported by the default printer monitor mode resident icon and results;

FIGS. 15A to 15C are views showing the types and contents of a resident icon and my job status monitor icon in a default printer monitor mode;

DETAILED DESCRIPTION OF THE PREFERRED EMBODIMENTS

Preferred embodiments of the present invention will now be described in detail in accordance with the accompanying drawings.

In this embodiment, a default printer means a logical printer, and a device means a physical printer device which is actually connected to a client computer via, e.g., a network. The logical printer is a software expression of a physical printer, and a plurality of logical printers can be created for one physical printer. Each logical printer undergoes various default print setups (e.g., the type of output port used to transmit data to a physical printer (including output destination information such as an IP address or the like), a default paper size, and the like). This logical printer is also called a printer object or the like.

Figure 1:
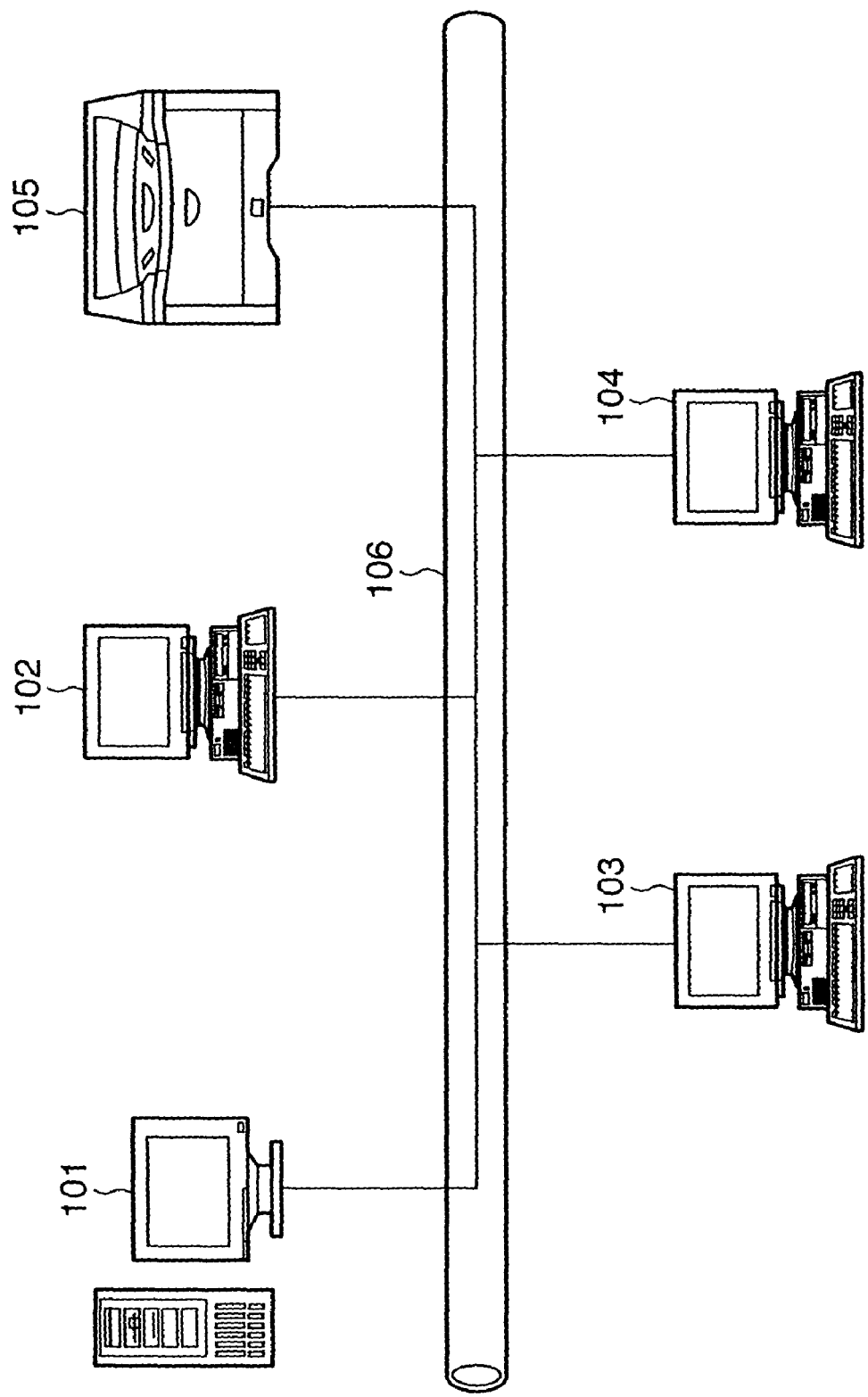
FIG. 1 is a block diagram for explaining the arrangement of an information processing system to which an embodiment of the present invention can be applied.

FIG. 1 is a block diagram for explaining the arrangement of an information processing system to which the present invention can be applied. Assume that one or a plurality of client computers are connected in this system.

Referring to FIG. 1, reference numerals 102, 103, and 104 denote information processing apparatuses which serve as client computers (clients), and are connected to a network 106 via a network cable such as Ethernet® or the like. Each client can execute various programs such as application programs and the like, and is installed with a printer driver which converts print data into a printer language that is supported by or can be interpreted by a printer. Note that the printer driver in the present invention supports a plurality of printer drivers, as will be described in detail later.

Reference numeral 101 denotes an information processing apparatus which serves as a server of this embodiment (to be referred to as a print server hereinafter) and is connected to the network 106 via the network cable. The print server stores files used on the network and monitors the use state of the network 106. The print server 101 has a function of monitoring a plurality of printers connected to the network 106.

As an arrangement, the clients 102 to 104 and print server 101 are general information processing apparatuses, and each client and print server executably store print control programs that implement different or associated control processes.

The print server 101 is a general information processing apparatus and can also have the functions of the clients 102 to 104. When software that implements the functions of the print server 101 is installed in each of the clients 102 to 104, this embodiment can be achieved without any physical, independent print server 101.

The print server 101 in this embodiment also has a function of storing and printing print jobs that include print data corresponding to print requests issued from the client computers 102, 103, and 104, a function of receiving only job information that does not include any print data from the client computers 102, 103, and 104, managing the print order of print data to be output from the client computers 102, 103, and 104 to the printer, and sending a transmission permission message of a print job including print data to a client that reaches its print order, and a function of acquiring status of the network printer 105 and various kinds of information of print jobs, and notifying the client computers 102, 103, and 104 of them.

Reference numeral 105 denotes a network computer which serves as a print control apparatus, and is connected to the network 106 via a network interface (not shown). The network printer interprets a print job that includes print data and is transmitted from the client computer or print server 101, so as to convert the print job into dot image data, and prints page by page. Reference numeral 106 denotes a network which connects the client computers 102, 103, and 104, server 101, network printer 105, and the like so as to allow them to make communications.

Figure 2:
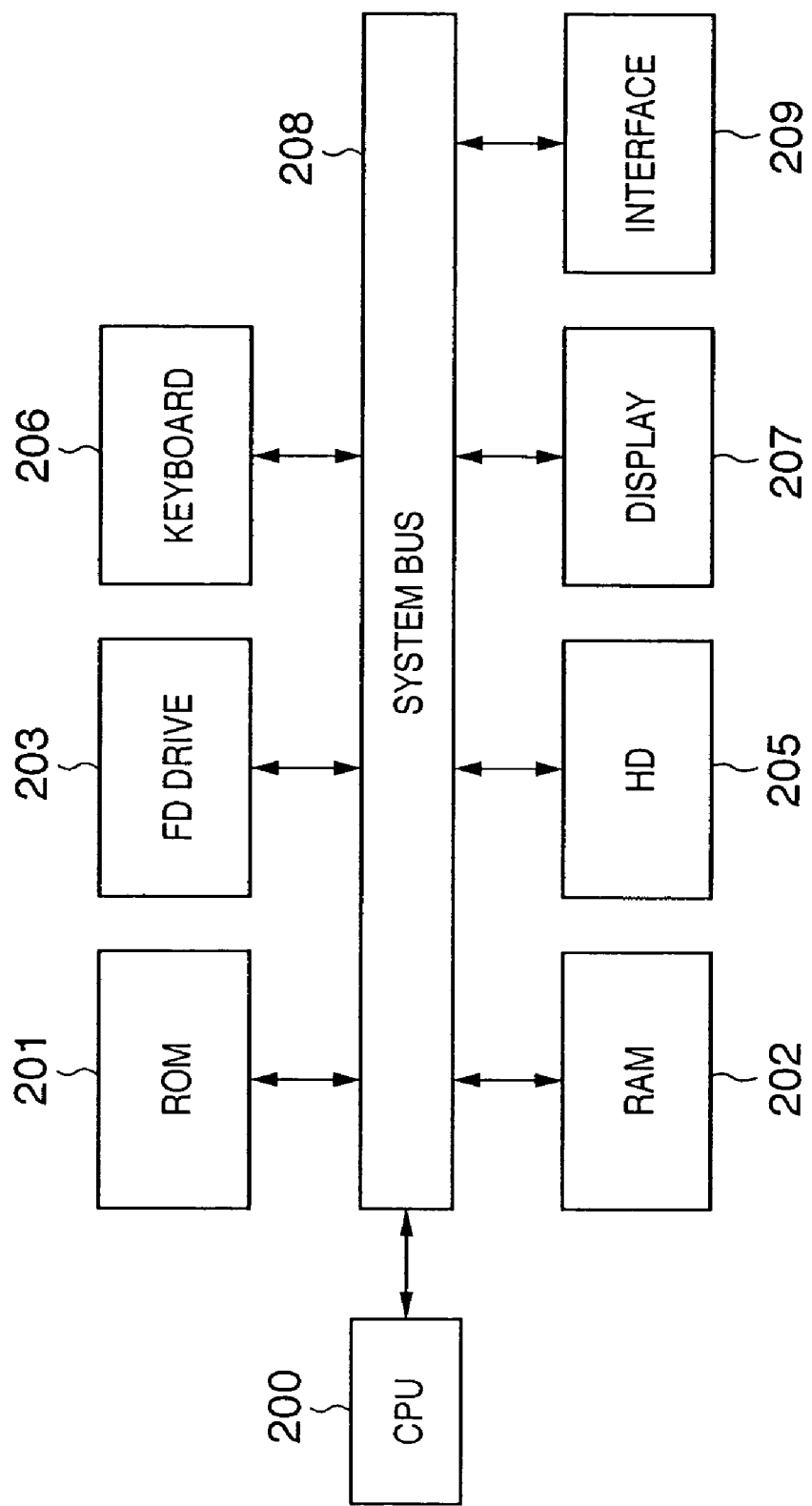
FIG. 2 is a block diagram showing the arrangement of an information processing apparatus according to an embodiment of the present invention.

FIG. 2 is a block diagram for explaining an information processing apparatus according to the present invention. The client computers 102, 103, and 104 as information processing apparatuses have the same arrangement, and the server 101 also has the same or equivalent hardware arrangement. Hence, FIG. 2 will be explained as a block diagram used to explain the arrangement of the client and server.

Referring to FIG. 2, reference numeral 200 denotes a CPU as control means of the information processing apparatus. The CPU 200 makes control to execute an application program, printer driver program, OS, network printer control program of the present invention, and the like, which are stored in a hard disk (HD) 205, and to temporarily store information, files, and the like required to execute programs on a RAM 202.

Reference numeral 201 denotes a ROM as storage means. The ROM 201 stores programs such as a basic I/O program and the like, and various data such as font data, template data, and the like used in a document process. Reference numeral 202 denotes a RAM as temporary storage means, which serves as a main memory, work area, and the like of the CPU 200.

Figure 5:
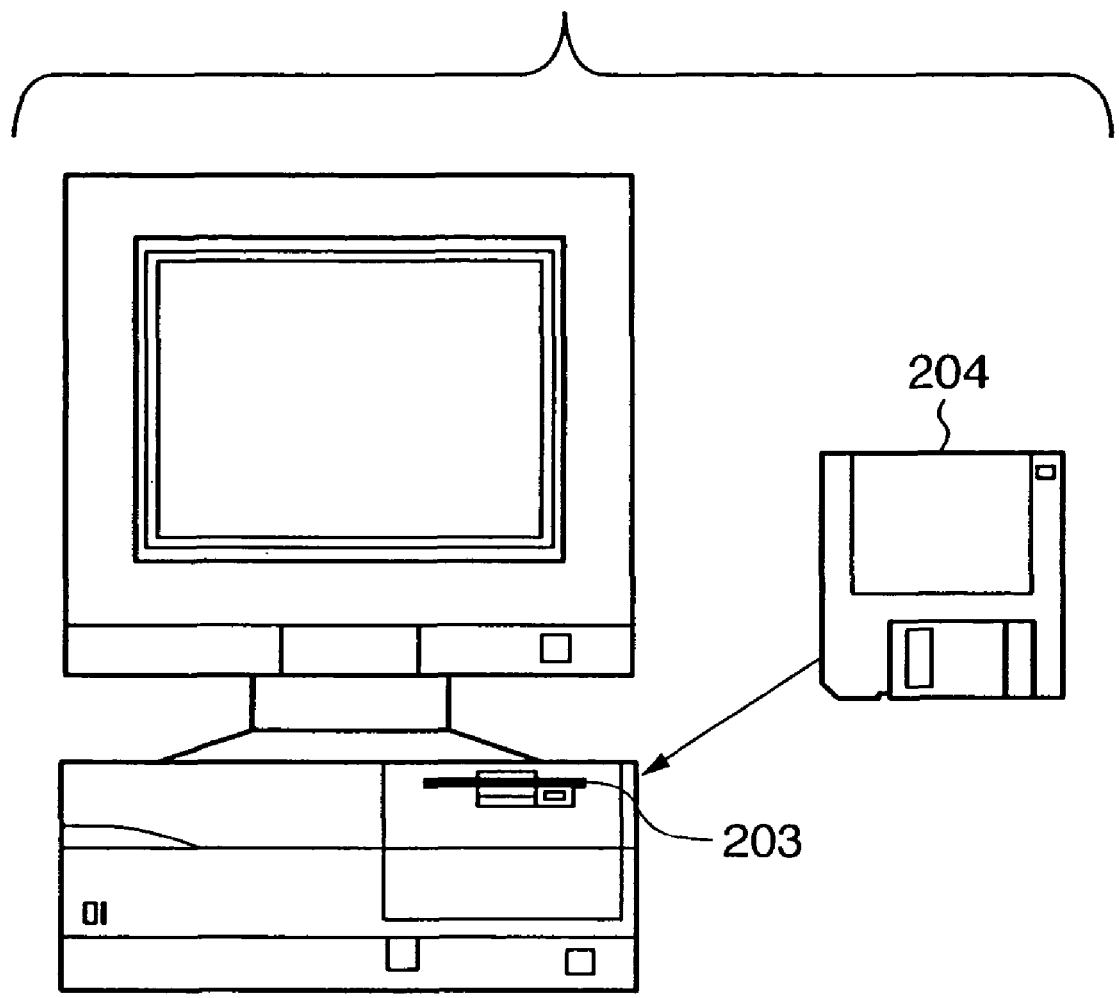
FIG. 5 shows the relationship of the FD 204 to be inserted into an FD drive 203 shown in FIG. 2.

Reference numeral 203 denotes a Floppy® disk (FD) drive as storage medium load means. A program stored in an FD 204 as a storage medium can be loaded onto the computer system of this embodiment via the FD drive 203, as shown in FIG. 5 (to be described later). Note that the storage medium is not limited to the FD, and various other storage media such as a CD-ROM, CD-R, CD-RW, PC card, DVD, IC memory card, MO, memory stick, and the like may be arbitrarily used.

Reference numeral 204 denotes a floppy disk (FD) as a storage medium, which stores a computer-readable program.

Reference numeral 205 denotes a hard disk (HD) which is one of external storage means, and serves as a large-capacity memory. The HD 205 stores an application program, printer driver program, OS, network printer control program, associated programs, and the like. Furthermore, a spooler as spool means is assured on the HD 205. The spool means corresponds to a client spooler on the client, or a server spooler on the print server. In the print server, a table used to store job information received from the client and to make order control is generated and stored in this external storage means.

Reference numeral 206 denotes a keyboard as instruction input means (pointing device). With the keyboard 206, the user inputs commands such as a device control command and the like to the client computer, or an operator or administrator inputs such commands to the print server. As the pointing device, a keyboard & mouse, liquid crystal touch panel, and the like may be applied.

Reference numeral 207 denotes a display as display means, which displays commands input from the keyboard 206, the status of the printer, and the like.

Reference numeral 208 denotes a system bus which controls the flows of data in the computer as the client or print server.

Reference numeral 209 denotes an interface as input/output means. The information processing apparatus exchanges data with an external apparatus via the interface 209.

Figure 3:
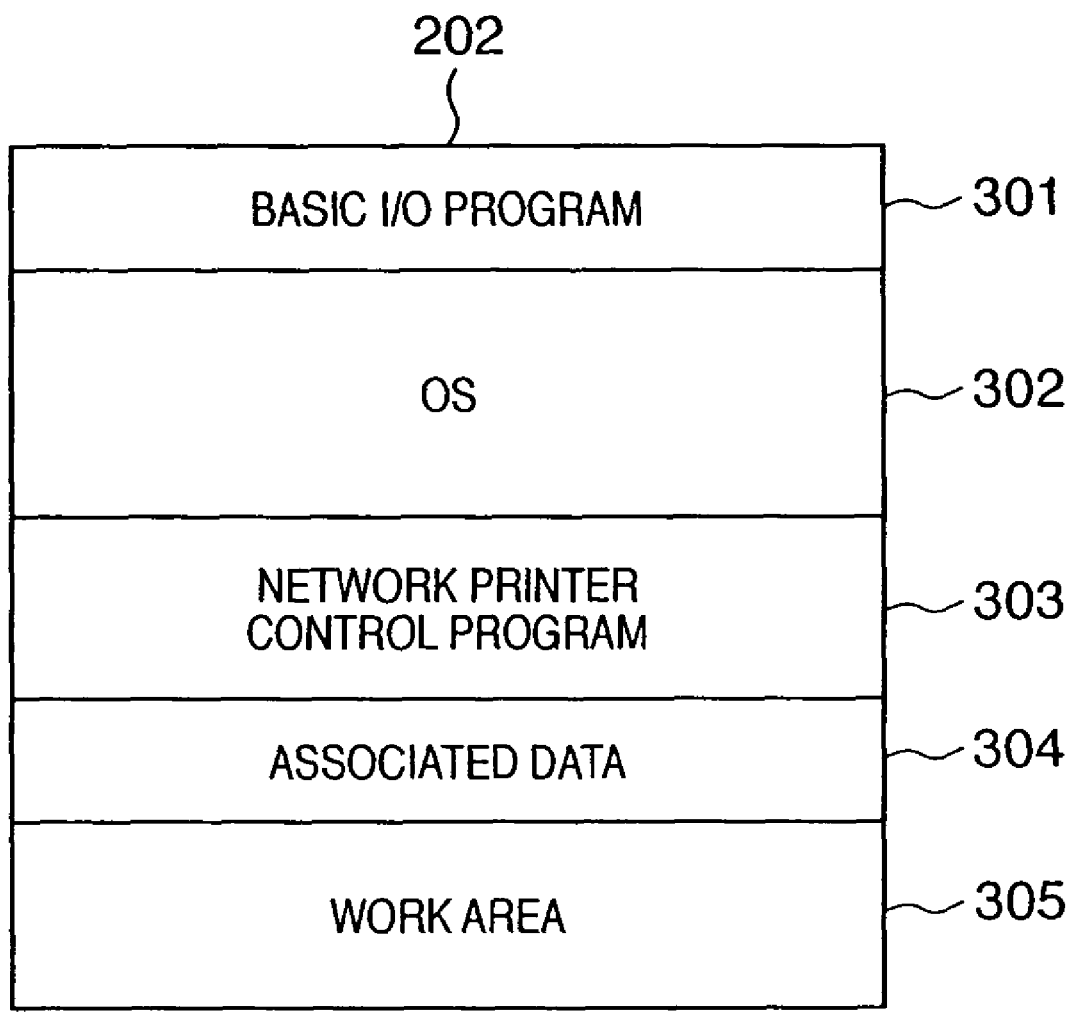
FIG. 3 shows an example of the memory map of a RAM 202 shown in FIG. 2.

FIG. 3 shows an example of the memory map of the RAM 202 shown in FIG. 2, i.e., the memory map in the state wherein the network printer control program is loaded from the FD 204 onto the RAM 202 and is ready to run.

In the example of this embodiment, the network printer control program and associated data are directly loaded from the FD 204 onto the RAM 202 when they are executed. In addition, every time the network printer control program is launched from the FD 204, it may be loaded from the HD 205 on which the network printer control program has already been installed onto the RAM 202.

As media that store the network printer control program, a CD-ROM, CD-R, PC card, DVD, IC memory card, and the like may be used in addition to the FD as long as they can store information. Furthermore, the network printer control program of this embodiment may be stored in the ROM 201 to form the memory map, and may be directly executed by the CPU 200.

Software programs that implement functions equivalent to those of the aforementioned devices may be used in place of hardware devices.

The network printer control program will also be simply referred to as a print control program. The print control program includes a program which makes control for instructing to change the print destination of a print job and instructing to change the print order at the client, and a program for making the order control of print jobs, and notifying a print end, print destination change request, and the like of a print job. The print control program of the present invention which makes such control may be divided into modules to be installed in the client and those to be installed in the print server, or a single print control program may serve as that for a client or print server depending on its execution environment. Also, modules having functions for a client and those having functions for a print server may be installed in a single computer, and may run at the same time or may run time-divisionally to attain pseudo parallel operations.

Reference numeral 301 denotes a basic I/O program, which is an area that stores a program having an IPL (initial program loading) function which loads an OS from the HD 205 onto the RAM 202 when the power switch of this control apparatus is turned on and starts the operation of the OS, and the like.

Reference numeral 302 denotes an operating system (OS); and 303, a network printer control program which is stored in an area assured on the RAM 202. Reference numeral 304 denotes associated data which is stored in an area assured on the RAM 202. Reference numeral 305 denotes a work area which is assured by the CPU 200 to execute the printer control program.

Figure 4:
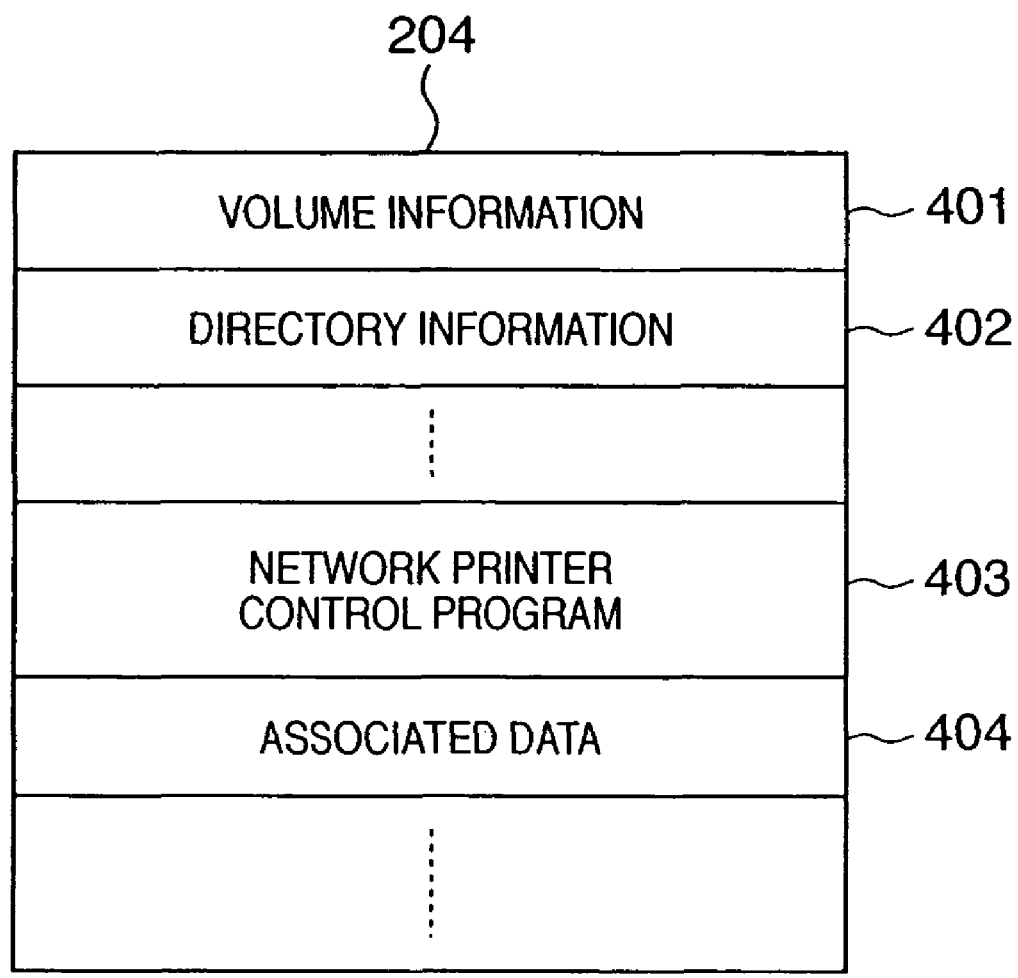
FIG. 4 shows an example of the memory map of an FD 204 shown in FIG. 2.

FIG. 4 shows an example of the memory map of the FD 204 shown in FIG. 2.

Referring to FIG. 4, reference numeral 400 denotes the data contents of the FD 204; 401, volume information indicating information of data; 402, directory information; 403, a network printer control program as a print control program to be explained in this embodiment; and 404, associated data of the program. The network printer control program 403 is programmed based on the flowcharts described in this embodiment, and has the same configuration for both the client and server in this embodiment.

FIG. 5 shows the relationship with the FD 204 to be inserted into the FD drive 203 shown in FIG. 2, and the same reference numerals in FIG. 5 denote the same parts as in FIG. 2.

Referring to FIG. 5, the FD 204 stores the network printer control program and associated data described in this embodiment.

Figure 6:
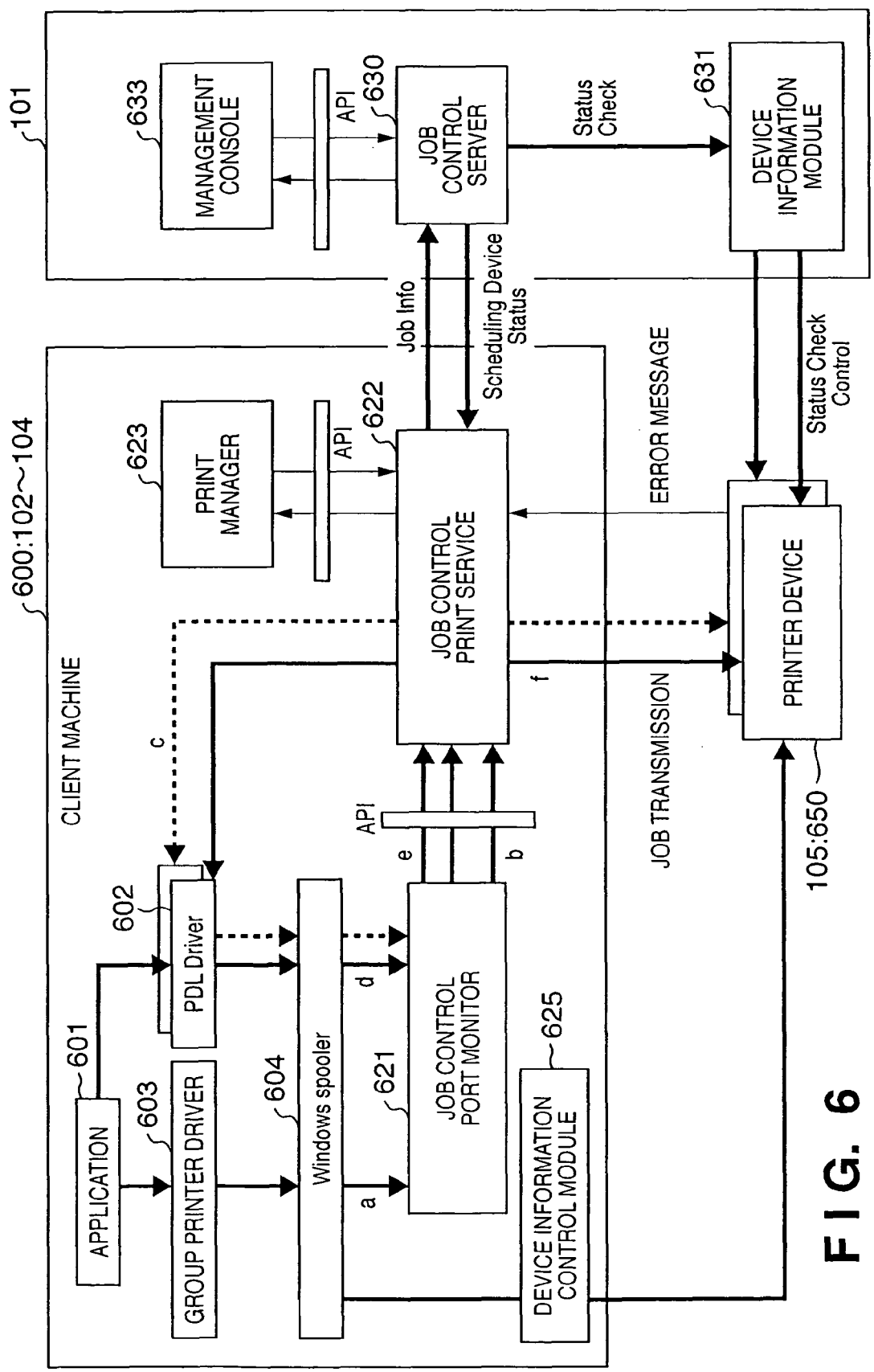
FIG. 6 is a diagram showing the flow of processes of a job in a print job control system to which an embodiment of the present invention is applied.

FIG. 6 is a diagram showing how to process a print job issued by a general application (e.g., Microsoft Word®) by a print job control system in this system. Referring to FIG. 6, reference numeral 600 denotes a client machine, which indicates a machine on which a client module of the print job control system runs. The client machine 600 corresponds to one of the clients 102 to 104 shown in FIG. 1.

Normally, when a print instruction is issued, an application program generates a series of rendering commands (GDI) via the mechanism of the OS, and passes them to a Windows Spooler via a printer driver. The Windows Spooler passes print job data to a port monitor selected by the user and controls it to transmit the data to a printer device. This processing sequence corresponds to the processing route of 604 and 625 in FIG. 6. In this embodiment, in addition to the monitor process of the printer and job status in such conventional print route, print routes to be described below are assumed.

In one print route, the user designates a logical printer, which is associated in advance with a port monitor 621 for the print job control system (to be simply referred to as a job control port monitor hereinafter in this embodiment), and issues a print instruction.

In this case, an application program 601 generates a series of rendering commands. Upon reception of these rendering commands, a group printer driver 603 generates a versatile print file, and transmits print job data to the job control port monitor 621 in place of a port monitor that transmits print job data to a printer device. The job control port monitor 621 transfers the print job data to a print service 622 for the print job control system (to be simply referred to as a job control print service hereinafter in this embodiment) in place of a printer device 650 (105).

A print process from the group printer driver 603 will be described in more detail below. The group printer driver 603 converts a series of rendering commands generated by the application program into a versatile print file as a file of an intermediate format which is independent from the types of printer devices, OSs, and the like. The configuration of the versatile print file will be described later.

This versatile print file is sent from the Windows Spooler 604 to the job control print service 622 (*b*) via the job control port monitor 621 (*a*). The job control print service 622 generates rendering commands on the basis of the versatile print file in accordance with the type of job control to be applied to this print job (c). Next, a PDL driver 602 converts these rendering commands into a PDL file that can be interpreted by the printer device 650. In the example shown in FIG. 6, the job control print service 622 executes job control that divides the print job into two jobs, i.e., it generates two member jobs, as indicated by two arrows (c). The PDL file generated by the PDL driver 602 is passed to the job control print service 622 again (e) via the Windows Spooler 604 and the job control port monitor 621 (*d*). The job control print service 622 transmits the PDL print job data to the printer device 650 in accordance with an instruction of a job control server 630 (*f*).

The job control print service 622 logically divides one versatile print file into a plurality of print jobs in accordance with an instruction of a print instruction in the versatile print file, and transmits these jobs to different printer devices, or re-transmits a print job that has been transmitted once to another printer device. Note that (c), (d), (e), and (f) in FIG. 6 indicate routes of print job data in such case.

As another print route, a case may be assumed wherein the application software generates a versatile print file, and directly throws it in that versatile print file as a print job. In such case, the way information is passed to the group printer driver 603 and the processing contents in the group printer driver 603 are different from those of a general application. As described above, when the general application passes rendering information to the group printer driver 603, it calls a Windows GDI function as in a normal printer driver, and the group printer driver 603 generates a versatile print file according to that function. By contrast, in case of an application that directly generates a versatile print file, the application already has a versatile print file, and supplies it to the group printer driver 603. The group printer driver 603 rewrites the contents of a print instruction in the versatile print file on the basis of a print method, which is set in advance, as needed, and sends that file to the Windows Spooler 604.

As still another print route, a case may be assumed wherein a print instruction is issued without designating the job control port monitor 621, and a job is thrown into the printer device 650 without generating any versatile print file. In such case, rendering commands generated via the OS are passed to the printer (PDL) driver 602 in place of the group printer driver 603 (601→602), and print data generated by the printer driver 602 is thrown into the printer device 650 via the Windows Spooler 604, job control port monitor 621, and job control print service 622. At this time, the job control print service 622 transmits print data on the basis of an IP address, printer name, and MAC address, which are associated in advance with the logical printer of the printer driver 602.

The job control print service 622 applies a print job control process (to be described later) to print job data.

A print manager 623 for the print job control system (to be simply referred to as a job control print manager hereinafter in this embodiment) is a program that provides a user interface (UI) that allows the user to check the status of a print job in the job control print service 622 and to manipulate the print job.

The job control print manager 623 exchanges information and instructions with the job control print service 622 via an interface (API) of software of the job control print service 622. In FIG. 6, the job control print manager 623 is illustrated in distinction from the job control print service 622, but may be included in the functions of the job control print service 622.

A system server 630 for the print job control system (to be simply referred to as a job control server hereinafter in this embodiment) makes central control (scheduling) of transmission timings of print job data from the job control print service 622 on each individual client 600 to the printer device 650. Note that 101 in FIG. 6 corresponds to the print server 101. However, when the functions of this print server 101 are included in each individual client machine 600, print job data are scheduled by each individual client machine.

A management console 633 for the print job control system (to be simply referred to as a job control management control hereinafter in this embodiment) exchanges information and instructions with the job control server 630 via an API required for software of the job control server 630 to access, thus monitoring the whole print job control system.

The job control server 630 communicates with each printer device 650 using a device information control module 631 to acquire information associated with a print job in that printer and the operation state of the printer, and to make various operations such as a job cancel operation and the like. The job control server 630 can pass the acquired information to the job control print service 622 on the client 600 side. When the functions of the print server 101 are included in each individual client machine 600, the job control print service 622 itself acquires information associated with a print job in that printer and the operation state of the printer, and makes various operations such as a job cancel operation and the like.

Note that a device information control module 625 in FIG. 6 runs when a job is transmitted to the printer device 650 without the intervention of the job control port monitor. The basic function of the module 625 is the same as that of the device information control module 631, and a detailed description thereof will be omitted.

Figure 8:
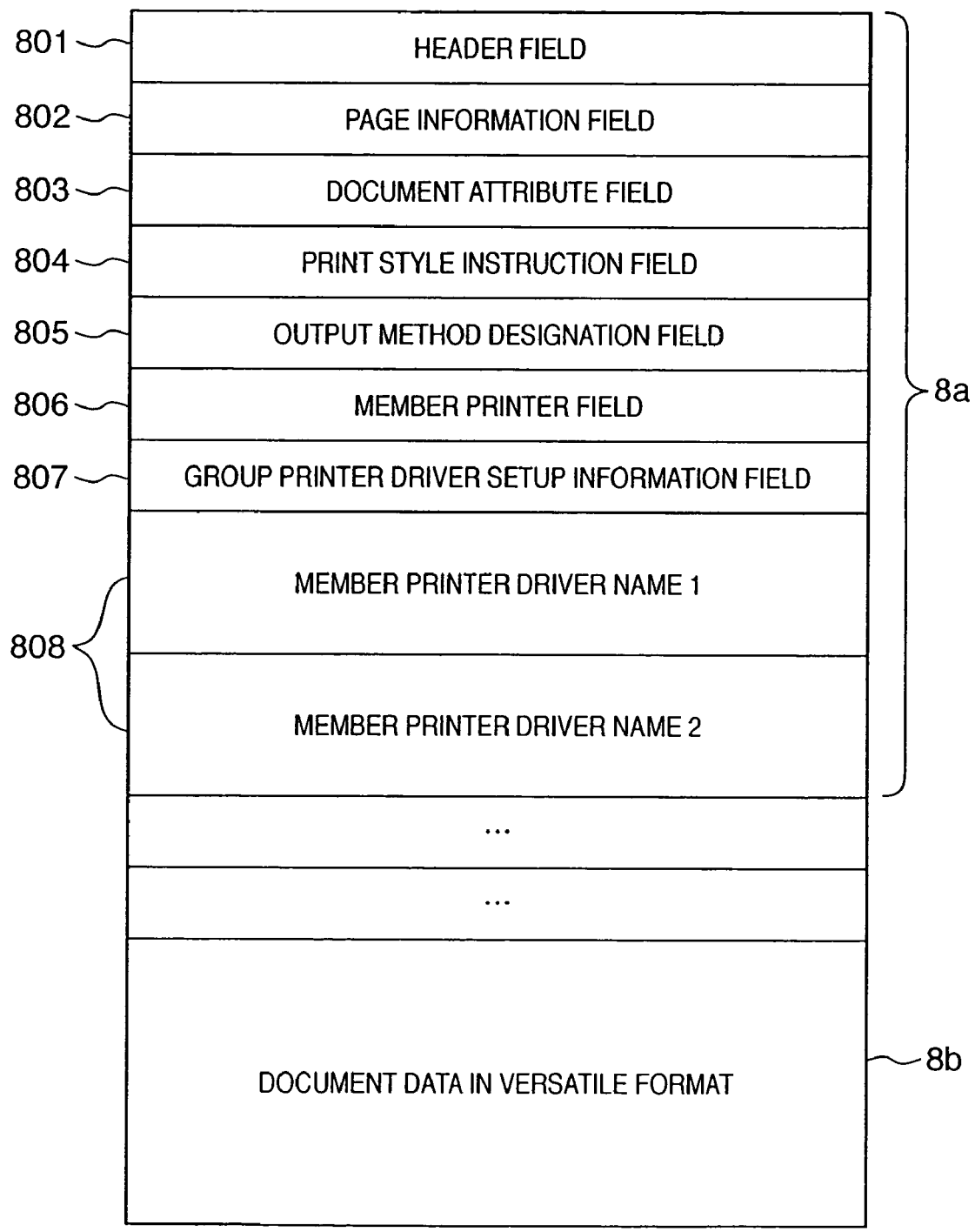
FIG. 8 shows the internal configuration of job data.

FIG. 8 shows an example of the configuration of a versatile print file.

The versatile print file used in this embodiment includes a print instruction field 8*a* and document data field 8*b*. The print instruction field describes information of a document and a print instruction. Document data is obtained by converting data of a document generated by an application into data of a versatile format such as PDF (trademark of Adobe Systems Corporation) or the like, and has a data format which is independent from a printer language.

The print instruction field 8*a* includes a header field 801, page information field 802, document attribute field 803, print style instruction field 804, output method designation field 805, member printer count 806, group printer driver setup information field 807, member printer driver names 808, and the like.

The header field 801 stores information such as version identification data, file information, and the like of this file.

The page information field 802 stores information such as the number of pages, each page size, and the like of document data in the document data field 8*b*.

The print style instruction field 804 stores information associated with an output style such as a print page range, the number of copies to be printed, imposition information (N-UP, booklet print, or the like) of document data, a staple instruction, punch instruction, and the like.

The output method designation field 805 stores information such as distributed print, color-monochrome distributed print, substitutional print, multicasting print, and the like as an output method.

The member printer count 806 stores the number of member printers associated with the group printer driver.

The group printer driver setup information field 807 stores setup information of a UI of the group printer driver (to be described later). For example, the group printer driver setup information field stores DEVMODE information as setup information of a driver UI of each member printer.

The member printer driver name 808 stores a printer driver name of each member printer.

The member printer driver name 808 and group printer driver setup information field 807 have storage areas in correspondence with the number of member printers stored in the member printer count.

The group printer driver 603 described using FIG. 6 above records setups on a group printer driver GUI in the print instruction field 8*a* upon generation of the versatile print file. The group printer driver 603 converts data received as GDI data into versatile data, and records the converted data in the document data field of the versatile print file as document data.

Note that this file may include the print instruction field 8*a* and document data field 8*b* as independent files. In this case, the print instruction field is present as a print instruction file, and the document data field is present as a document data file. These files can be combined in a single archive format and can be similarly handled as a single file.

Figure 7:
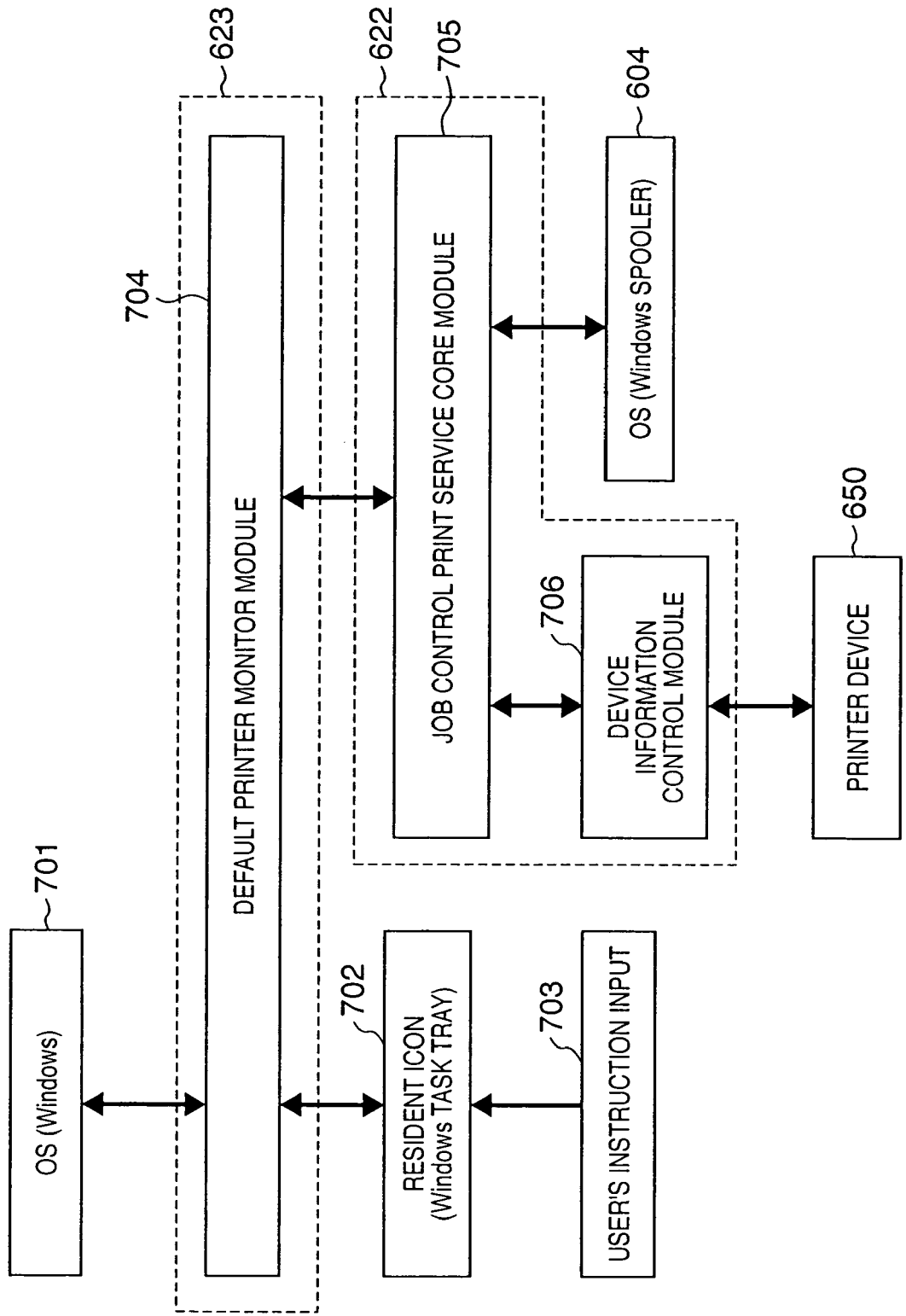
FIG. 7 is a block diagram showing the internal arrangement of the print job control system to which the embodiment of the present invention is applied.

FIG. 7 is a functional block diagram for explaining details of the job control print service 622 and print manager 623 in FIG. 6. Blocks 604, 622, 623, and 650 in FIG. 7 are basically equivalent to those denoted by the same reference numerals in FIG. 6.

The two-way arrows in FIG. 7 indicate the state wherein respective modules exchange information with each other. In practice, the modules exchange information via the mechanism of the OS in practice. As the mechanism of the OS, an OS call, call back, and the like may be used.

A module 704 corresponds to the arrangement of the print manager 623 in FIG. 6, which has a function of monitoring to an input to a resident icon 702 via the pointing device. Also, the module 704 serves as control means that makes a display instruction to a resident display on the basis of the monitoring result.

As a representative example of the resident icon in this embodiment, an icon displayed on a task tray of the Windows is known. The task tray displays icons of various kinds of software, which may trouble the user if they quit all of a sudden. An icon displayed on the task tray as the resident icon will be exemplified below. Of course, the resident icon is not limited to this.

The default printer monitor module 704 determines the type of an instruction to the resident icon, which is detected via the mechanism of the OS. This printer monitor module 704 controls a function of recognizing information provided by a device information control module 706 that monitors the status of the printer, and displaying a result based on the recognition as a resident display. Since the default printer is set as an object to be monitored, the status of the printer which is most frequently used by the user can be easily monitored without selecting a printer to be monitored in each process. Since the default printer, which is most frequently used by the user, is set as the object to be monitored in place of a plurality of printers, the status of the printer can be reflected on the display of the limited task tray icon.

Note that the resident icon will be described in detail later.

On the other hand, a job control print core module 705 and the device information control module 706 correspond to the arrangement of the job control print service 622 in FIG. 6.

FIG. 7 shows the state wherein the status of the printer device 650 is acquired via this device information control module 706. However, the printer device 650 in FIG. 7 may be replaced by the job control server 630 in FIG. 6. The core module 705 has a function of acquiring the status data of the printer device and those of jobs in the printer device via the device information control module 706, and notifying the default printer monitor module 704 (print manager 623) of the acquired information.

Upon reception of the information, the default printer monitor module 704 controls to make a status display on the resident icon 702 in correspondence with the received information. Note that the process of the default printer monitor module 704 will be described in detail later.

Blocks 604 and 701 indicate the OS (operating system) modules on which this print control system runs, and these OS modules exchange various kinds of information with the job control print service 622 and print manager 623.

The core module 705 of the job control print service 622 acquires information of a printer, which is set as the default printer, from the OS module (Windows Spooler) 604.

Figure 9:
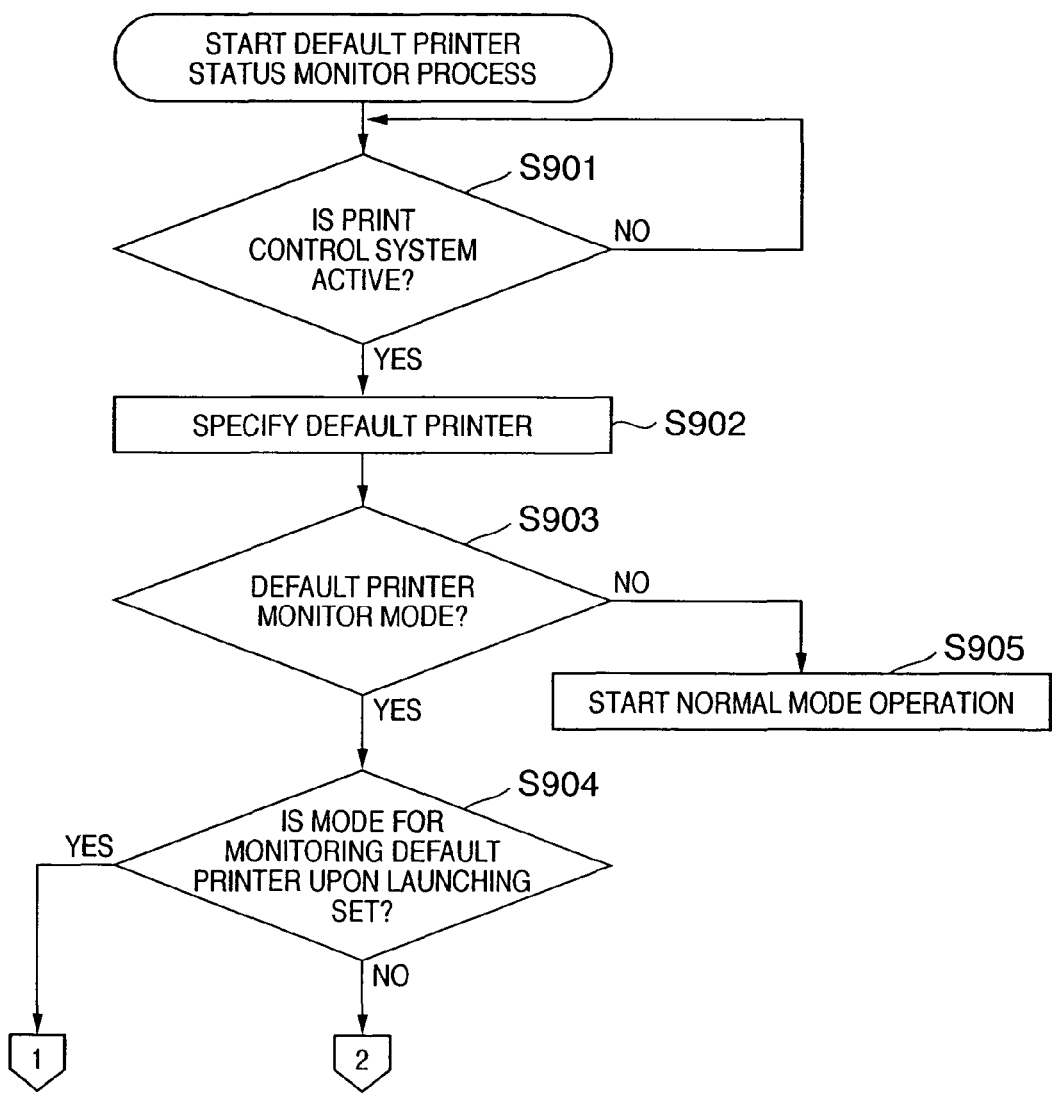
FIG. 9 is a flowchart showing the flow of processes in an operation mode upon launching a print manager 623 to which the embodiment of the present invention is applied.

FIG. 9 is a flowchart showing a process executed upon launching a program module that reflects the status of the default printer. In this embodiment, this process corresponds to a process executed at a launch timing of the print manager 623 in FIG. 6.

In step S901, the print manager 623 checks if the job control print service 622 (print control system) has been launched. If it is determined that the job control print service 622 has been launched (YES in step S901), the control enters a process for displaying the resident icon. If it is determined that the job control print service 622 has not been launched yet (NO in step S901), the control returns to the process for checking if the job control print service 622 has been launched. In this embodiment, since the print manager 623 utilizes the function of acquiring various status data of the printer device of the job control print service 622, it is confirmed in step S901 if the job control print service 622 has been launched. However, if the print manager 623 itself can acquire various status data of the printer device, the process in step S901 may be omitted.

If it is determined in step S901 that the job control print service 622 has been launched, a printer which is currently set as the default printer is specified via the mechanism of the OS in step S902, and that information is saved in a predetermined internal storage area in a format that can be referred to by the print manager 623. For example, the default printer to be monitored can be acquired using a "GetDefaultPrinter( )" function in the Windows NT/2000/XP®. When the default printer has been changed to one of a plurality of logical printers registered in the operating system of the client machine 600, the default printer to be specified in step S902 is also changed accordingly. In other words, even when the user has changed the default printer in the operating system, the monitoring process of the new default printer is guaranteed in correspondence with that change. In the Windows, the default printer can be changed via a UI of a control panel. The default printer corresponds to a printer which is set as a default upon making a print process via, e.g., document creation software.

As indicated by information exchange between the print manager 623 (especially, the default printer monitor module 704 in the manager 623) and OS (Windows) 701 in FIG. 7, the print manager 623 specifies the default printer in step S902, and sets it in its internal default printer information. When the print manager 623 acquires various kinds of information of the default printer in, e.g., the flowcharts of FIGS. 12 and 13, it acquires status information in association with the printer which is set and stored in the default printer information.

Figure 10:
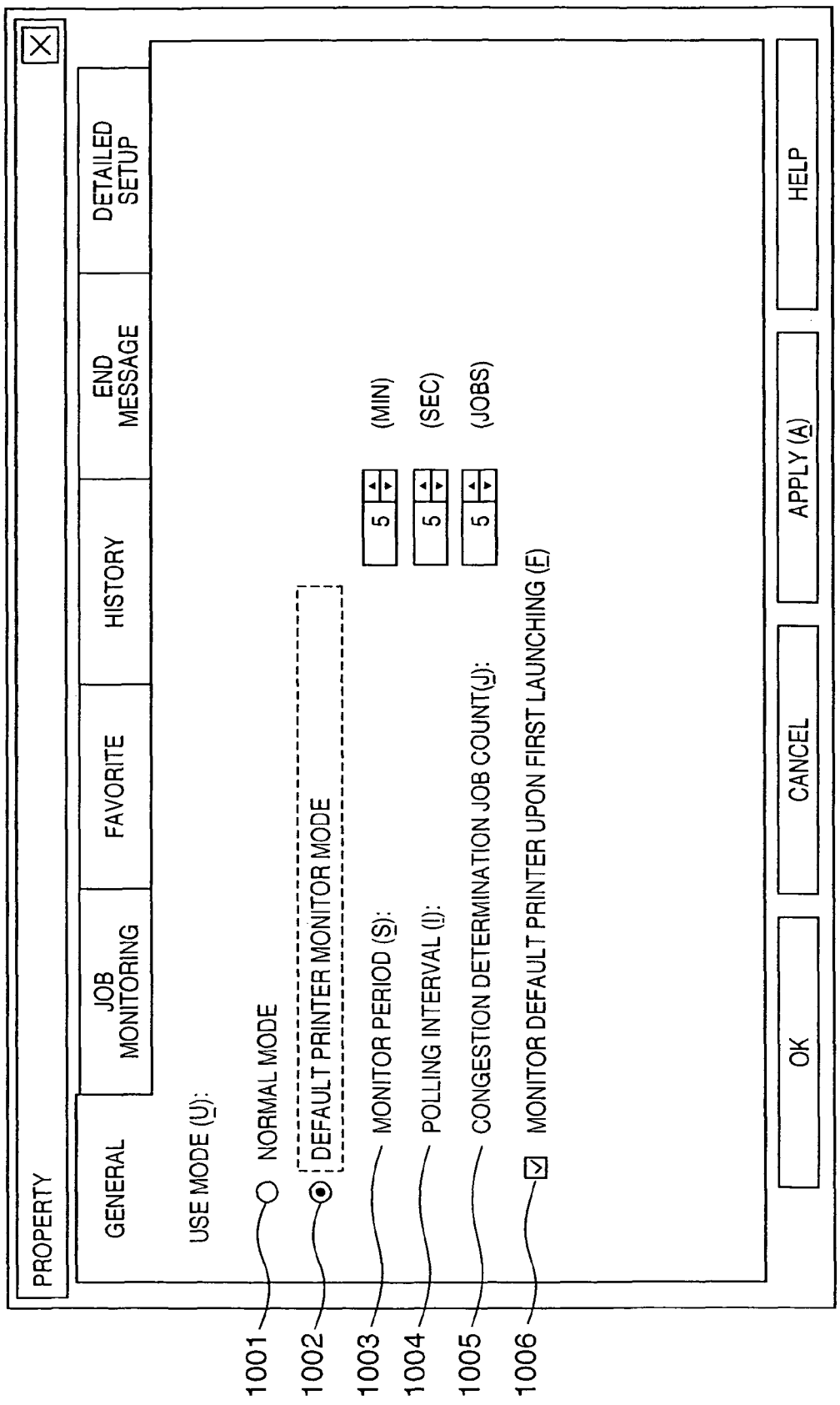
FIG. 10 shows a dialog used to make property setups such as the operation mode and the like of the print manager 623 to which the embodiment of the present invention is applied.

It is checked in step S903 if the current operation mode of the resident icon is a default printer monitor mode. This process corresponds to a process for checking if a radio button 1002 in FIG. 10 is checked, as will be described in detail later. If YES in step S903, the control enters a process for displaying a default printer monitor mode resident icon indicating the status of the default printer on the task tray on the client screen. In this way, since the resident icon is displayed on the task tray, the monitor result of the default printer can be displayed without concealing display of other applications. In addition, since that monitor result is displayed as an icon which allows the user to intuitively understand its meaning, the user can easily recognize the monitor result. The types and contents of the icons will be described later using FIGS. 15A to 15C.

Note that "resident display of an icon" in this embodiment means that an icon is always displayed on the task tray of the computer display screen upon starting up the client computer so as to be able to receive a user's instruction, and its display pattern can be changed in response to a user's instruction to that icon during icon display. In the resident display, an icon is displayed on the task tray. However, the present invention is not limited to the task tray, and an icon may be displayed on a fixed region other than an application display region on the computer screen. Note that a bar display (bar length or the like) indicating one application does not change depending on the number of tasks unlike a task bar, and the display position or order, the display size, and the like of the resident icon on the fixed region always remain the same. Also, the resident icon is characterized by reflecting the monitor result of the monitor module of jobs and devices, which is launched in response to an instruction to the resident icon, on the display of the resident icon, unlike a shortcut icon which is used to launch a predetermined application. Note that the Windows XP can partially hide and display the task tray. The task tray in such display mode can also be applied as resident display in this embodiment.

Figure 11:
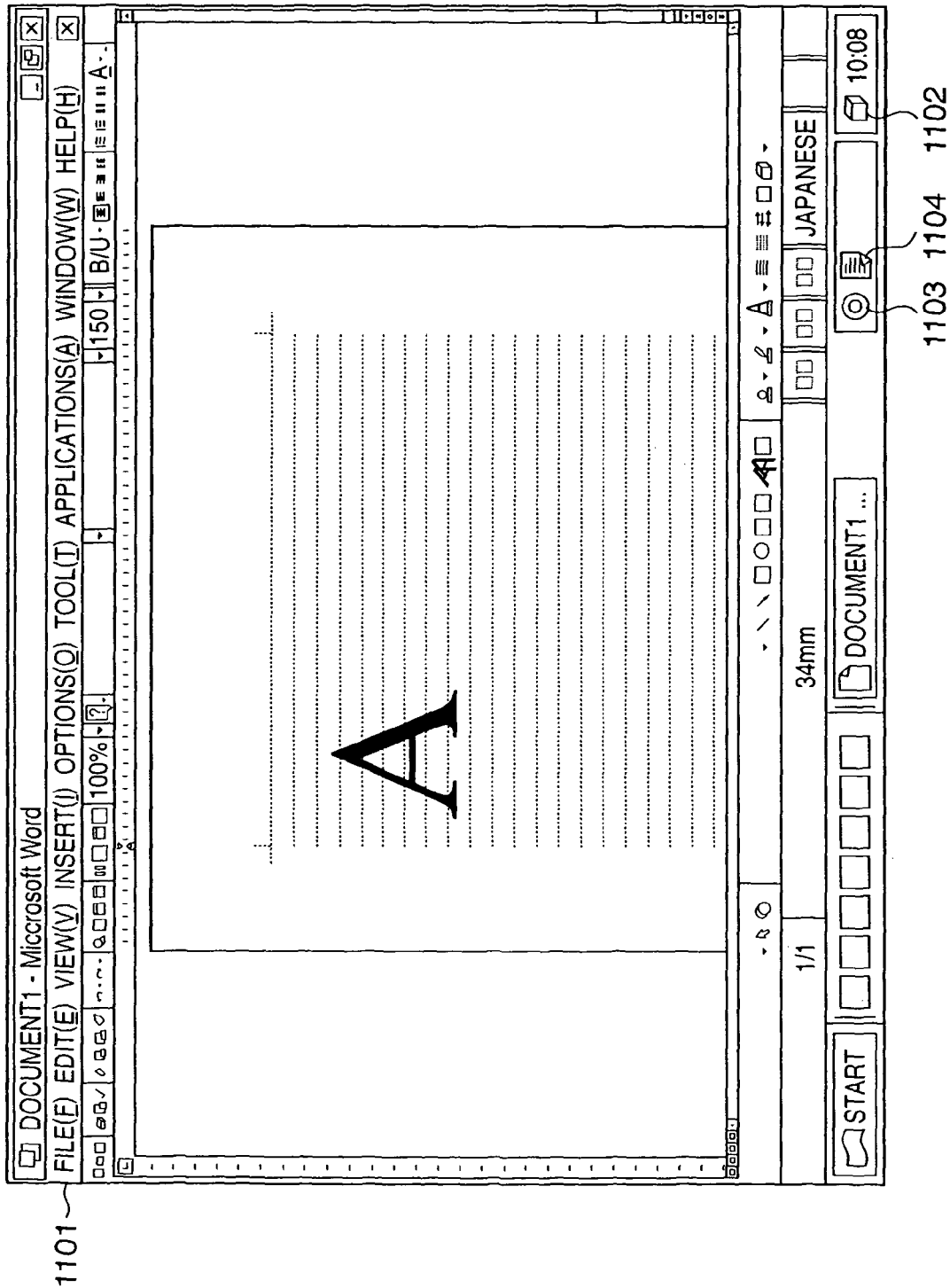
FIG. 11 shows a resident icon to be displayed by the print manager 623, to which the embodiment of the present invention is applied, on a task tray on a Windows® desktop.

FIG. 11 shows the state wherein the default printer monitor mode resident icon is displayed on the task tray of the client screen as an example of the resident icon.

Referring to FIG. 11, reference numeral 1101 denotes an edit window of document processing software, which runs on the client. Reference numeral 1102 denotes a task tray. Reference numeral 1103 denotes a resident icon. The resident icon 1103 is switched to a default printer monitor mode resident icon or a normal mode resident icon with a fixed display pattern, which is used to directly launch a detailed status application of each device and job, in accordance with the operation mode set using items 1002 and 1003 in FIG. 10 mentioned above. By double-clicking this normal mode monitor icon, a normal monitor utility that displays device information and job information in more detail than the resident display in this embodiment is launched. As this normal monitor utility, a utility that can display not only information of the default printer, but also the status data of a plurality of printers and the detailed status data (a time until job end, job attributes, and the like) of jobs in the printer, as disclosed in Japanese Patent Laid-Open Nos. 2002-149388 and 11-327856 above can be applied. In this way, since the system comprises both the normal monitor utility and default printer monitor mode resident icon, the user can browse desired information as needed.

Reference numeral 1104 denotes a job status monitor icon displayed upon issuing a print request in this embodiment.

If NO in step S903, i.e., if the current mode of the resident icon is not the default printer monitor mode but the normal mode, the flow advances to step S905 to display the normal mode resident icon on the task tray of the client screen.

If it is determined in step S903 that the current operation mode is the default printer monitor mode, it is checked in step S904 if a mode for monitoring the default printer upon launching is selected. That is, it is checked if an item 1006 in FIG. 10 is checked, as will be described later. If YES in step S904, the flowchart in FIG. 13 is executed to display the default printer monitor mode resident icon 1103, and to start monitoring of the status of the default printer at the same time, thus reflecting the status on the icon display. The flow then advances to step S1301 in FIG. 13. If NO in step S904, the control enters the process in the flowchart shown in FIG. 12, and monitoring of the status of the default printer is not immediately started.

In this embodiment, the default printer as a logical printer is monitored. However, in practice, the status of a physical printer which links the logical printer is indirectly monitored via the logical printer.

FIG. 10 shows the display state of a user interface used to make setups which are to be referred to in steps S903 and S904 in the flowchart of FIG. 9.

These setups have predetermined initial setup contents in a default state. When the user wants to change these setups, he or she selects "property" from a menu displayed by right-clicking the resident icon by the pointing device, thus displaying this user interface on the screen.

A "normal" mode setup item 1001 is selected when the print manager 623 is used in the normal mode, and the aforementioned normal mode resident icon is displayed.

A "default printer monitor mode" setup item 1002 is selected when the print manager 632 is used in the default printer monitor mode. When this setup is enabled, the default printer status monitor icon is displayed upon launching this print system.

These setup items 1001 and 1002 are realized using radio buttons, and the normal mode and default printer monitor mode are exclusively selected. These items are used to set the mode to be referred to in step S903 by the user.

A "monitor period" setup item 1003 is used to set a period for monitoring the status of the default printer in response to a predetermined launch instruction to the resident display icon. Since this period can be set, monitoring operation can be performed during a predetermined period before and after the user requires the status of the printer to be monitored. Hence, information that the user wants can be sufficiently provided, and the network load can be reduced compared to a case wherein the default printer is to be monitored all the time.

A "polling interval" setup item 1004 is used to set an acquisition interval of the number of jobs in a device so as to detect the degree of congestion of the device when the default printer status monitor icon monitors the status of the default printer. By setting a long interval of the item 1004, the network communication load can be reduced.

A "congestion determination job count" setup item 1005 is used to set the number of jobs in the device required to determine "congestion". For example, a user who handles jobs with large sizes, and a user who handles jobs with small sizes may set different numbers of jobs for congestion determination. However, by providing this setup item 1005, users of various print business formats can be supported. This setup value is reflected in a display process in step S1302 in FIG. 13.

When a "monitor default printer upon first launching" setup item 1006 is enabled, monitoring of the default printer automatically starts from a switching timing of the default printer status monitor mode (upon first launching or upon switching this setup). When this "monitor default printer upon first launching" setup item 1006 is enabled, YES is determined in step S903 in FIG. 9.

Details of the default printer monitor process by the default printer monitor module 704 will be described below using FIGS. 9, 12, and 13.

If it is determined in step S904 above that "monitor default printer upon first launching" setup is not enabled, an instruction for displaying the default printer status monitor mode resident icon 1103 in a non-monitor state is issued in step S1201. The print manager 623 displays the resident icon on the task tray using, e.g., a Shell_NotifyIcon( ) function of the Windows API.

In steps S1202, S1204, and S1206, processes for switching processing operations to be executed are done in accordance with the types of instructions to the resident icon (resident display). This instruction corresponds to an input 703 via the pointing device in FIG. 7.

If the user moves the mouse cursor to the resident icon displayed in the non-monitor state and superposes it on the default printer status monitor icon (YES in step S1202), the print manager 623 receives that event information from the resident icon 702 in step S1203, and tooltip-displays the name and status of the default printer as text. Since such display is allowed, the user can easily visually recognize the name and status of the default printer by only superposing the cursor on the icon, resulting in convenience.

Figure 16:
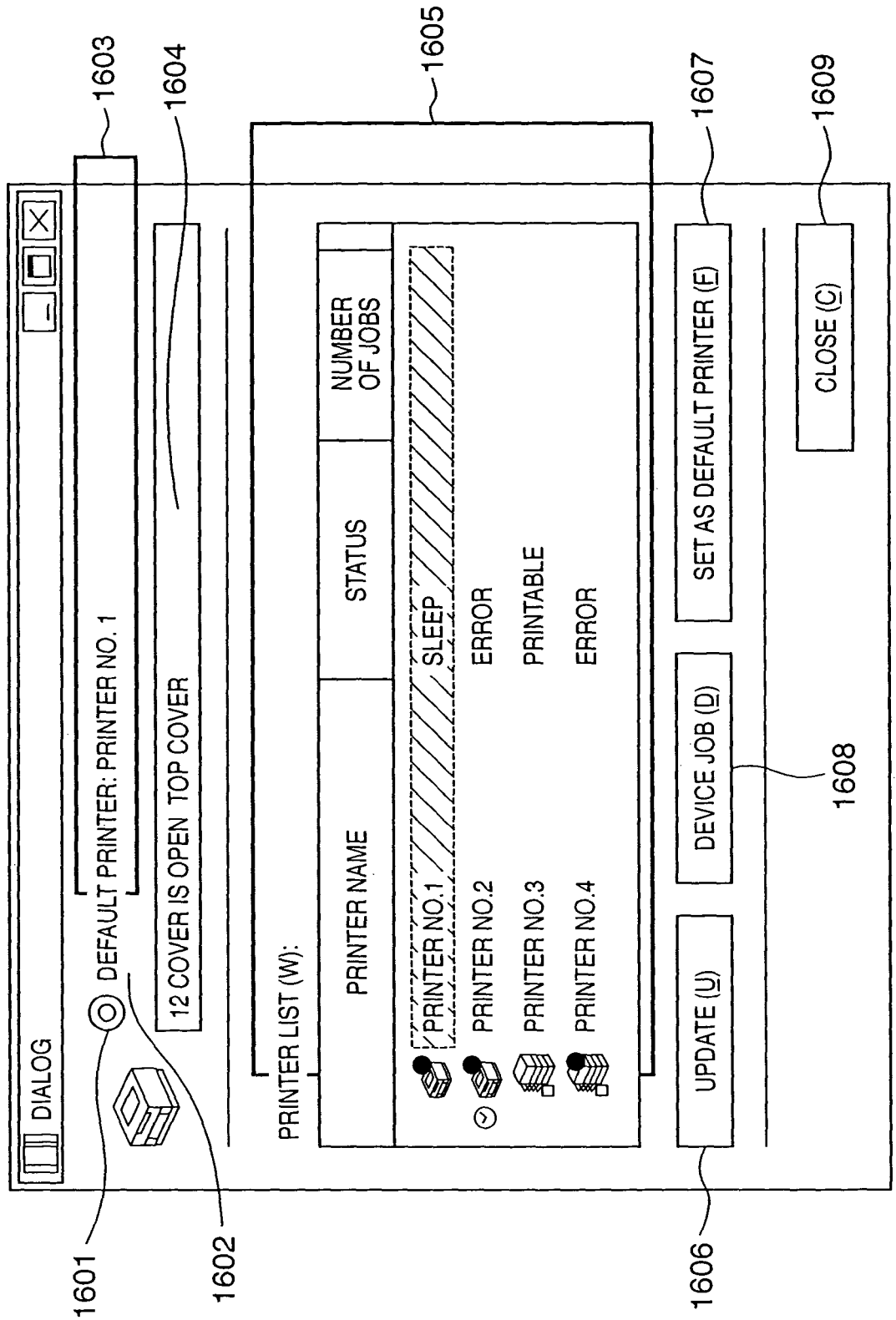
FIG. 16 shows an outer appearance of a default printer status dialog.

If the user left-double-clicks the default printer status monitor mode resident icon 1103 displayed in the non-monitor state (YES in step S1204), the print manager 623 opens a default printer status dialog 1600 in step S1205. FIG. 16 shows details of the default printer status dialog 1600.

The dialog shown in FIG. 16 is active parallel to the default printer monitor mode resident icon 1103 after it is opened until a "close" button 1609 is pressed. Note that control is made to inhibit two or more default printer status dialogs 1600 from displaying at the same time. In this manner, the status dialog can be opened by double-clicking the icon to easily switch the default printer. Since the monitor operation of the default printer and the switching operation of the default printer can be parallelly done, if the resident icon is changed to an error display state, an old default printer can be smoothly switched to a new default printer.

If the user left-single-clicks the default printer status monitor mode resident icon 1103 displayed in the non-monitor state (YES in step S1206), the print manager 623 stores the time of this event in step S1208, and starts status monitoring of the default printer according to the setups via the setup dialog in FIG. 10 (the control advances to 1 in FIG. 13). In this manner, by left-single-clicking the icon by the mouse device, the non-monitor state of the default printer can be easily-switched to the monitor state.

It is checked in step S1207 if an instruction for changing the default printer is issued via the dialog opened in step S1205. If such instruction is issued, the internal default printer information of the print manager 623 is updated in step S1209.

It is checked in step S1210 if a job which has been issued to the default printer and is in a state before completion is found. If such job is found, status monitoring of the default printer is started (the control advances to step S1301 in FIG. 13). If such job is not found, the flow returns to step S1201 to display the default printer monitor mode resident icon 1103 in the non-monitor state. The presence/absence of a job in step S1210 can be checked by recognizing whether or not a job of the user who operates this print job control system to the default printer is stored in a print spooler. The same applies to step S1311 to be described later.

As described above, according to this embodiment, since the default printer can be controlled to make various operations in accordance with the mouse device operations on the resident icon, the need for inputting an instruction by purposely opening a control panel for each desired operation can be obviated for the user unlike the prior art, thus providing a very user-friendly user interface. In this embodiment, since the resident icon is displayed on the task bar region and the user can give an instruction to the icon displayed there, the default printer can be controlled to make various operations without disturbing display of Microsoft Word used to create a document to be printed itself and other applications.

The process in FIG. 13 will be described below. FIG. 13 shows a series of processes after step S904 in FIG. 9 or step S1210 in FIG. 12.

Referring to FIG. 13, the default printer is specified in step S1301. The process in step S1301 may be attained either by a process for referring to the default printer information held in the predetermined storage area, which has been explained in the process in step S902 above, or by repeating the process in step S902.

Physical printer information corresponding to the default logical printer set as an object to be monitored is acquired via MIB (Management Information Base) or a predetermined unique protocol in step S1302. More specifically, the print manager 623 requests to acquire status information of the default printer via the core module 705 of the job control print service 622, and updates the display state of the default printer monitor mode resident icon 1103 on the basis of information returned from the core module 705, as shown in FIG. 7. The information returned from the core module 705 to the print manager 623 includes status information of the device and jobs acquired by the core module 705 from the printer device 650 via the device information control module 706. The information acquired in step S1302 considers not only jobs of the client (user) that executes the flowchart in FIG. 13 but also jobs of other clients. In this manner, monitoring of the default printer starts and/or ends on the basis of the presence of a job of the self client (self user) in step S1210 in FIG. 12 or step S1311, and the status of the default printer reflected on the resident display in step S1201 is that of the physical printer corresponding to the default printer based on jobs of other clients (other users). Hence, whether or not jobs of other users must be considered can be efficiently selected.

In step S1303, a polling timer is set to update the default printer monitor mode resident icon 1103 at a predetermined time interval. The time interval set in the timer is a value which is set using the "polling interval" item 1004 in FIG. 10. The polling interval is set as an acquisition interval of the number of jobs in a device so as to detect the degree of congestion of the device when the default printer status monitor icon monitors the status of the default printer. By setting a long polling interval, the network communication load can be reduced. Therefore, when congestion is predicted to some extent (time band or device), a long polling interval is set.

Figure 12:
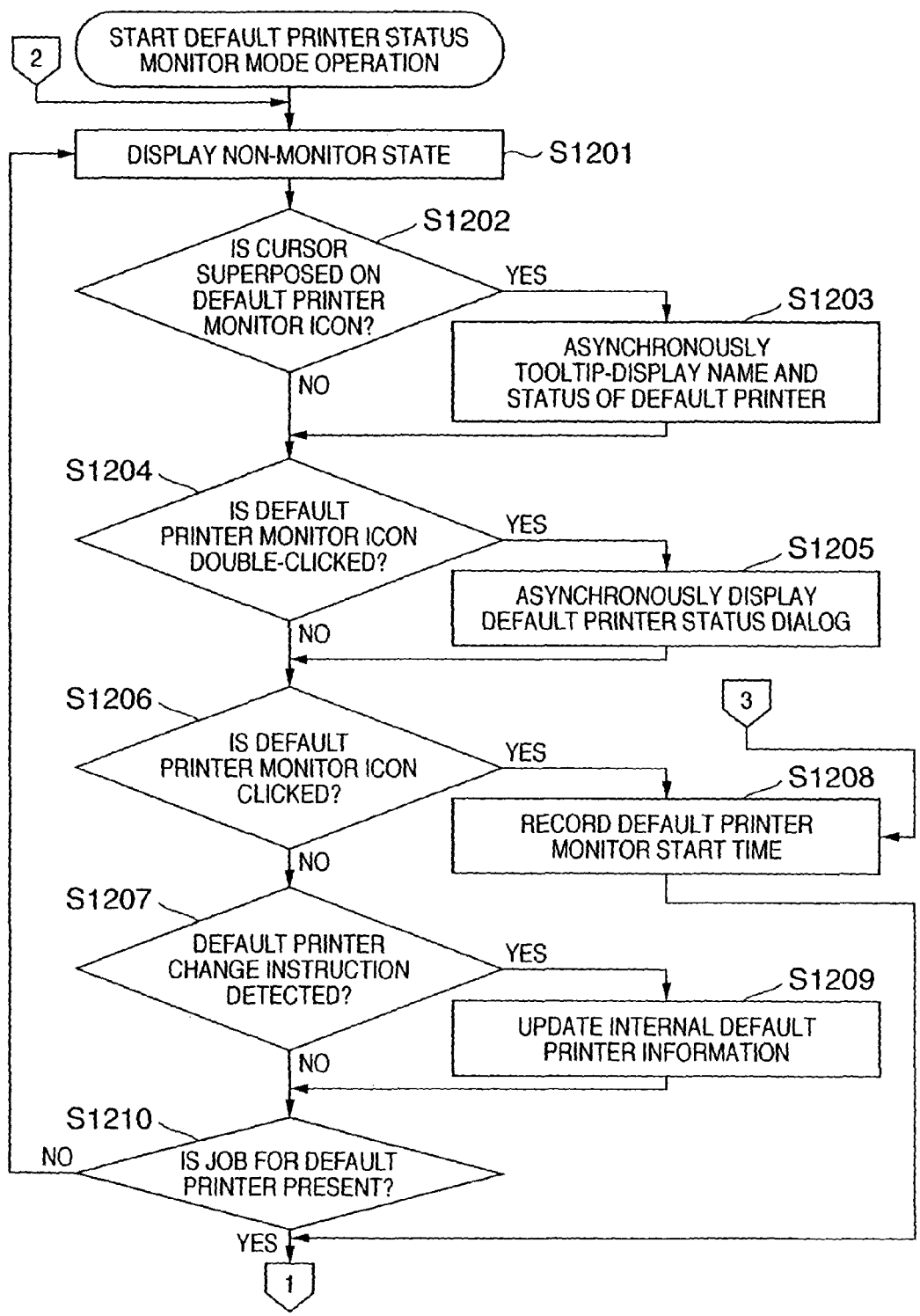
FIG. 12 is a flowchart showing the flow (former half) of the operation of a default printer monitor mode resident icon.
Figure 13:
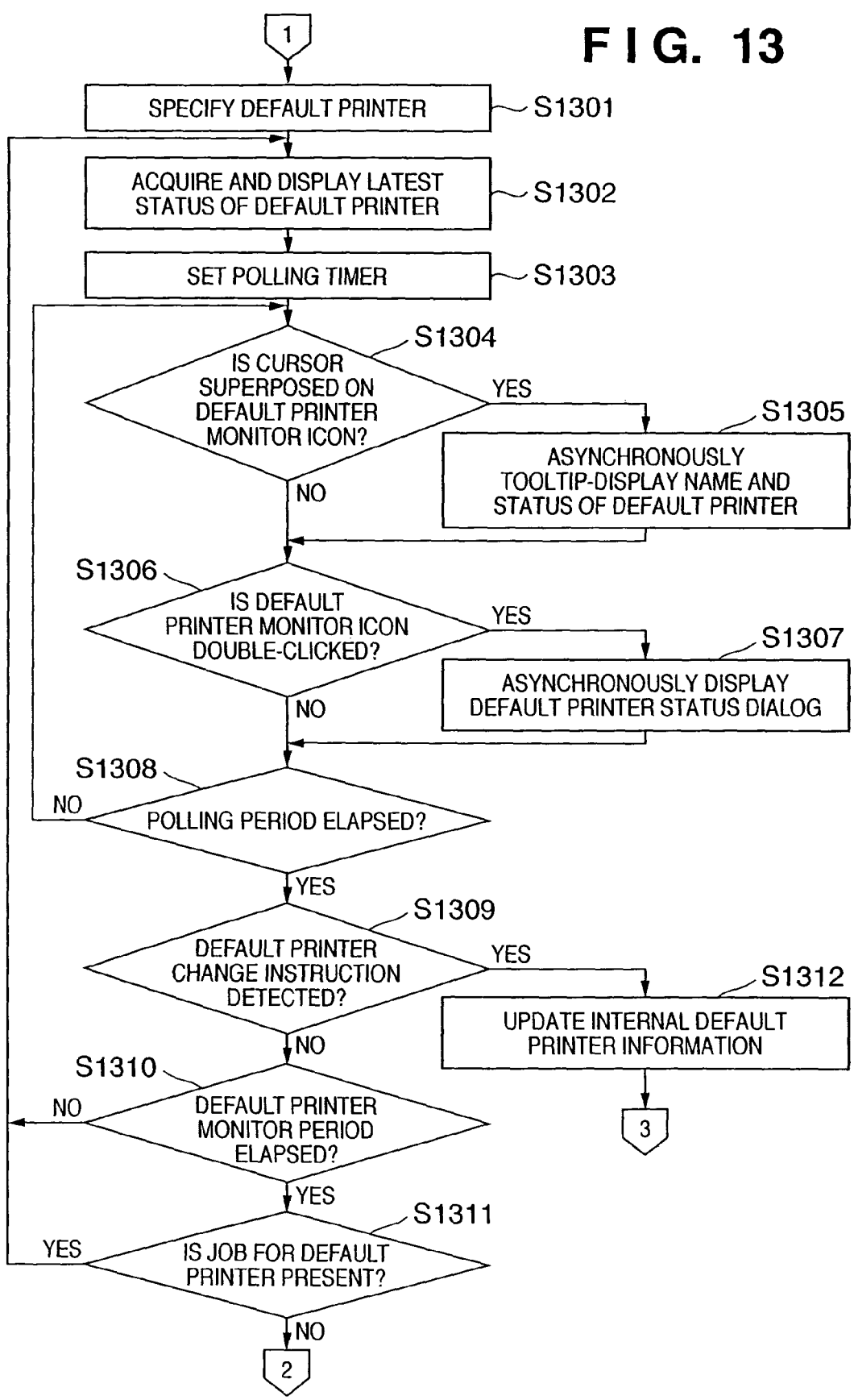
FIG. 13 is a flowchart showing the flow (latter half) of the operation of the default printer monitor mode resident icon.

In steps S1304 and S1306, processes for switching processing operations to be executed are performed in accordance with the types of instructions to the resident icon (resident display) as in steps S1202, S1204, and S1206 in FIG. 12.

If YES in step S1304, i.e., if the user moves the mouse cursor and superposes it on the default printer status monitor icon displayed in the non-monitor state, the print manager 623 receives that event information from the resident icon 702 in step S1305, and tooltip-displays the name and status of the default printer as text. Since such display is allowed, the user can easily visually recognize the name and status of the default printer by only superposing the cursor on the icon, resulting in convenience.

If YES in step S1306, i.e., if the user double-clicks the default printer status monitor mode resident icon 1103 displayed in the non-monitor state, the print manager 623 opens and displays the default printer status dialog 1600 in step S1307. The dialog is active parallel to the default printer monitor mode resident icon 1103 after it is opened until the "close" button 1609 is pressed. In this manner, the status dialog can be opened by left-double-clicking the icon to easily switch the default printer. Since the monitor operation of the default printer and the switching operation of the default printer can be parallelly carried out, if the resident icon is changed to an error display state, an old default printer can be smoothly switched to a new default printer.

In step S1308, the timer set in step S1303 is checked to see if the polling period has elapsed. If the polling period has not elapsed yet (NO in step S1308), the flow returns to step S1304. If the polling period has elapsed (YES in step S1308), the flow advances to step S1309.

It is checked in step S1309 if an instruction for changing the default printer is issued. If such instruction is issued, the internal default printer information of the print manager 623 is updated in step S1312, and the control advances to step S1208 in FIG. 12. If no such change instruction is issued, the flow advances to step S1310.

It is checked in step S1310 with reference to the time stored in step S1206 in FIG. 12 if a default printer monitor period has elapsed. The default printer monitor period uses a value set using the "monitor period" item 1003 on the dialog shown in FIG. 10. If the monitor period has not elapsed yet (NO in step S1310), the flow returns to step S1302. If the monitor period has elapsed, the flow advances to step S1311. In this manner, since the monitor period is assured and can be set by the user, information that the user wants can be sufficiently provided, and the network load can be reduced compared to a case wherein the printer is to be monitored all the time.

It is checked in step S1311 if a job which has been issued to the default printer and is in a state before completion is found. If such job is found (YES in step S1311), the flow returns to step S1302. If such job is not found, the flow advances to step S1201 in FIG. 12. If a job to be monitored still remains even after the monitor period has elapsed, monitoring is continued. Hence, if any abnormality occurs during processing of the remaining job, that abnormality can be immediately found. The user can immediately take a measure against such abnormality, and the flexibility of the device processing control can be improved.

As described above, when the flowcharts in FIGS. 12 and 13 are implemented, the user can easily confirm the status of the printer by inputting an instruction to the resident display on the task tray before he or she issues a print job to the default printer. Since the status of the default printer to be monitored is reflected on the resident display on the task tray in accordance with a confirmation instruction, the status of the printer can be efficiently confirmed without disturbing display of other applications. Even if an error has occurred in the default printer upon confirmation, the user can smoothly make a series of operations, i.e., can change the default printer to another printer free from any error and issue a print job.

In this embodiment, the monitor mode is launched by single-clicking the resident icon, and the monitor state can be started not only when a print request is issued but also when no print request is issued, resulting in very high convenience for the user.

FIG. 14 shows the correspondence between the types of input instructions to the default printer monitor mode resident icon 1103 in steps S1202, S1204, and S1206 in FIG. 12 and steps S1304 and S1306 in FIG. 13, and the processing operation contents of this print system. That is, when the user left-double-clicks the default printer monitor mode resident icon 1103, the status dialog is displayed. When the user right-single-clicks the icon 1103 by the mouse, a popup menu including items shown in FIG. 14 is displayed. In this case, if "display printer list", "individual printer", or "display job list" is selected from the displayed menu, the aforementioned normal monitor utility is launched with a different default display dialog depending on the selected contents. When the user left-single-clicks the icon 1103 by the mouse, status monitoring of the default printer starts. When the user superposes the mouse pointer on the region of the icon 1103, control is made to tooltip- or popup-display the items shown in FIG. 14.

The default printer status monitor icon will be described below using FIGS. 15A to 15C.

FIG. 15A shows the correspondence between the printer to be monitored and the display patterns of the resident icon based on information acquired from the printer device in step S1302 in FIG. 13. For example, these display patterns are used to display the resident icon in step S1302. As described above, the respective display patterns of the resident icon shown in FIG. 15A represent the states of the physical printer corresponding to the default printer in consideration of jobs of other clients (users).

Meanings of respective icon patterns will be briefly explained below with reference to FIG. 15A. A non-monitor status icon 1501 indicates a state wherein the default printer is not monitored. A manual feed icon 1502 indicates a "waiting state" of user's manual feed. A manual feed/congestion icon 1503 means a "waiting state" of user's manual feed and "congestion state". An icon 1504 indicates a printable state. An icon 1505 indicates a printable but congestion state. An icon 1506 indicates a warning state, and an icon 1507 indicates a warning state and congestion state. An icon 1508 indicates an error state, and an icon 1509 indicates an error state and congestion state. A status acquisition icon 1510 indicates that acquisition of the printer status is in progress. An icon 1511 indicates a printer which is not to be monitored.

FIG. 15C shows the correspondence between the display patterns of the default printer status monitor icon and queue/port/device state of the printer. The contents of the right column in FIG. 15C correspond to status information which is acquired by the print manager 623 from the printer device 650 via the job control print service 622. This status information is acquired via MIB or a status acquisition unique protocol, as described above.

"Manual feed" means a "waiting state" of user's manual feed. "Normal" means a printable state (including not only an idle state but also a printing state) without any special event. "Warning" is a generic term of printable states suffering some problems (e.g., the toner remaining amount is small). "Information" is a generic term of unprintable states free from any error (e.g., a warming-up state of a printer engine). "Offline" means a state wherein a communication channel for transmitting print data to the printer is disconnected. "Printer suspended" corresponds a state wherein the Windows "printer" is suspended, i.e., a state wherein transfer of print data stored in the Windows spooler to an external module (621, 605, or the like) is suspended. "Device operator call" is a state wherein the printer requires user's operation, and "device service call" is a state wherein the printer requires maintenance. "Port error" corresponds to a state wherein the job control print service 622 cannot communicate with the job control server 630 via a communication port, and cannot consequently acquire various kinds of information of the printer device 650 via the job control server 630. "Port suspended" corresponds to a state wherein spooled print data cannot be transmitted to the printer device via a job transmission port, as indicated by (f) in FIG. 6.

FIG. 15B shows the display patterns of a job status monitor icon, which indicate the status of a job of a given user of the printer which is being monitored. These display patterns are applied not only to jobs to the default printer.

When a job of the given user is input to the printer which is being monitored, the job status monitor icon is added to the task tray, and the status of that job is monitored from that timing until the job ends. After all jobs end, the icon is deleted from the task tray. When this job status monitor icon is double-clicked, a list of jobs issued by the given user is displayed.

An icon 1512 indicates a completion state of transfer of a job to the printer, and an icon 1513 means a state immediately after transfer of a job until end of the process, i.e., that a job process is in progress. An icon 1514 indicates a state wherein an error has occurred in a job, and an icon 1515 indicates a state wherein a job process is suspended.

FIG. 16 shows the display state of the default printer status dialog which is displayed in accordance with the processes in steps S1205 in FIG. 12 and step S1307, as described above.

A default printer icon 1601 is an icon (32*32) of the default printer, and allows to discriminate an LBP machine, MFP machine, machine of another company, color/monochrome, and the like.

A default printer status icon 1602 is an icon (16*16) indicating the status of the default printer, and represents the same status as that of the default printer status monitor icon.

A default printer name 1603 indicates the printer name of the default printer.

A Device panel character string 1604 displays the same contents as those of a character string displayed on an LCD panel of the default printer device. Even when the LCD panel displays the character string in two lines, it is displayed in one line. The panel character string can be acquired from only a printer which supports a panel character string acquisition command from a remote machine. Hence, when a model that does not support this command is the default printer, the panel character string display area itself is not displayed.

A printer status list 1605 displays the status icons, printer names, and the numbers of jobs in devices of respective printers. This list displays status data acquired at the time of displaying the status display UI. Printers displayed in this list are logical printers registered in the print system having the job control print service of the client machine 600 as a core.

Upon clicking an update button 1606, the display contents of the printer status list 1605 are updated.

When a default printer set button 1607 is clicked (pressed) after one of the printers displayed in the printer status list is selected, the default printer of the Windows can be switched.

A device job display button 1608 is used to display a list of jobs in the device of the printer selected from the printer status list. For example, when this button is clicked, a Web browser is launched to display a job list of a remote UI.

Upon clicking a close button 1609, the status display dialog is closed.

Figure 17:
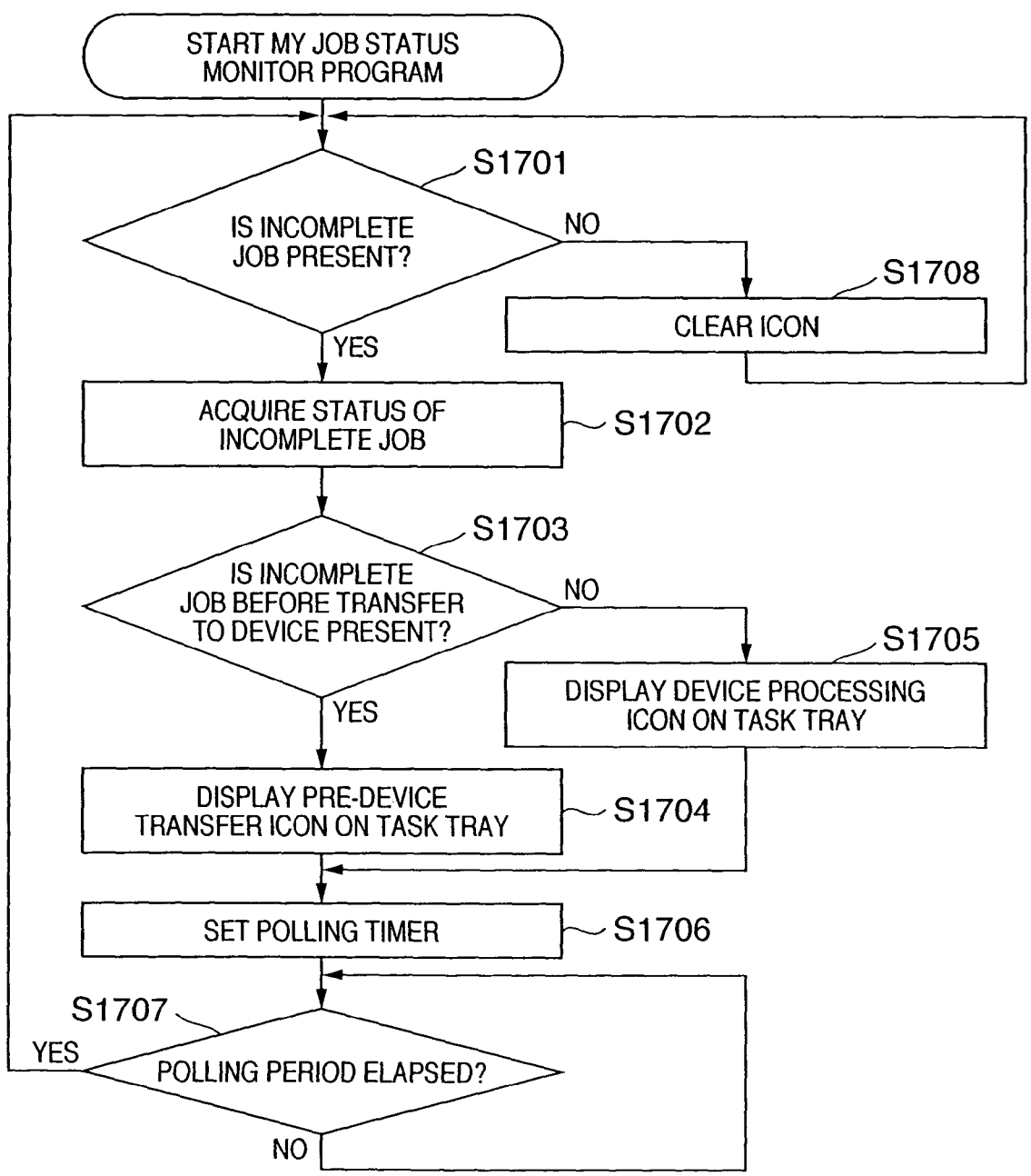
FIG. 17 is a flowchart showing the flow of processes of a my job status monitor program.

FIG. 17 is a flowchart showing a job detection process executed by the job control print service 622 in FIG. 6, i.e., the process for displaying the icon 1104 in FIG. 11. Also, this flowchart corresponds to the one for generating information to be referred to by the print manager 623 in step S1210 or S1311 described above. Note that the flowchart in FIG. 17 is asynchronously executed parallel to FIGS. 12 and 13.

A job status monitor program function starts in response to issuance of a print job while the print manager 623 is active.

It is checked in step S1701 if incomplete jobs issued by the self user are present. This checking process is attained by sending an inquiry from the print manager 623 to the job control print service 622 in FIG. 7. At this time, not only the default printer but also all logical printers registered in the print system having the job control print service of the client machine 600 as a core are checked. If NO in step S1701, the job status monitor icon 1104, which is displayed unnecessarily, is cleared in step S1708. If no such icon is displayed, that state is held. The job status monitor icon 1104 is unnecessarily displayed when the polling period has elapsed in step S1707 and no incomplete jobs are found. If YES in step S1701, the flow advances to step S1702.

In step S1702, status data of respective incomplete jobs are acquired. This process is implemented by sending an inquiry from the print manager 623 to the job control print service 622 in FIG. 7.

It is checked in step S1703 on the basis of the status information of the incomplete jobs acquired in step S1702 if these incomplete jobs include ones in a state before transfer to the device. If YES in step S1703, a pre-device transfer icon is displayed on the task tray as a resident display in step S1704. If NO in step S1703, a device processing icon is in progress is displayed on the task tray as a resident display in step S1705.

In step S1706, the update interval of the job status monitor icon is set in the polling timer.

In step S1707, the polling timer is checked to see if the update period has elapsed. If the update period has elapsed (YES in step S1707), the flow returns to step S1701. If the update period has not elapsed yet (NO in step S1707), the flow returns to step S1707.

When the flowchart in FIG. 17 is executed in this way, the user can easily confirm, on the task tray, the status of jobs issued by himself or herself, which include jobs issued to the default printer, and substitutional jobs from that printer. Since the monitor icon associated with job status (job status monitor icon) is displayed in addition to the printer monitor result, such UI is very convenient for the user. Furthermore, since this monitor icon is displayed on the task tray in the same manner as the default printer monitor mode resident icon, it does not conceal an active application display area, and does not trouble the user. Since the job status monitor icon is cleared upon completion of the process of jobs, it does not occupy an extra display area on the task tray.

Transition of the practical display states of the resident icon and other UIs on the task tray in this embodiment will be described below using FIGS. 18 to 20 in correspondence with FIGS. 12, 13, and 17.

Figure 18:
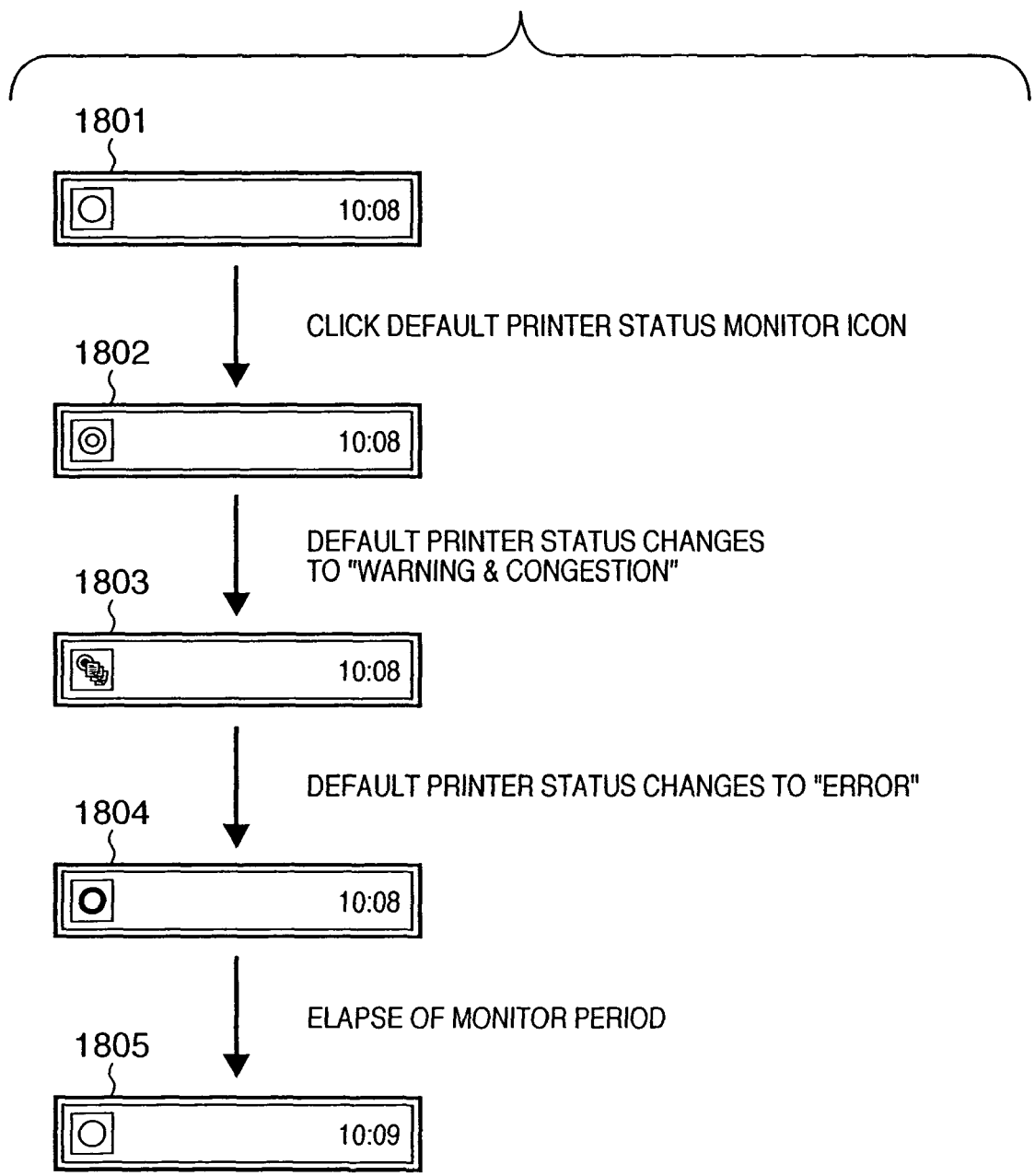
FIG. 18 shows an example of transition of icons displayed on the task tray.

A state 1801 in FIG. 18 indicates an initial display state when the operation mode is the default printer monitor mode in FIG. 9, and the mode that does not monitor the default printer upon launching is set. Therefore, an icon in the state 1801 indicates a non-monitor state, as indicated by 1501 in FIG. 15A.

A state 1802 corresponds to the display state of the latest status of the default printer in step S1302 in FIG. 13 via step S1208 in FIG. 12 since the default printer monitor mode resident icon 1103 is left-single-clicked in step S1206 in FIG. 12. The default printer monitor mode resident icon in this state indicates a printable state, as indicated by 1504 in FIG. 15A.

A state 1803 indicates that the display state of the default printer monitor mode resident icon is updated in step S1302 in FIG. 13 before it is determined in step S1310 in FIG. 13 that the default printer monitor period has elapsed, a predetermined number or more of jobs from other users are transferred to the device at that time, and a warning state is generated. The default printer monitor mode icon in this state indicates a warning & congestion state, as indicated by 1507 in FIG. 15A.

A state 1804 indicates that the display state of the default printer monitor mode resident icon is updated, and the device suffers an error state (error state icon: 1508) at that time.

A state 1805 indicates that it is determined in step S1310 that the default printer monitor period has elapsed, and since the user of interest does not input any job, NO is determined in step S1311 and the flow advances to step S1201 in FIG. 12 to set a non-monitor state (non-monitor state icon: 1501).

Figure 19:
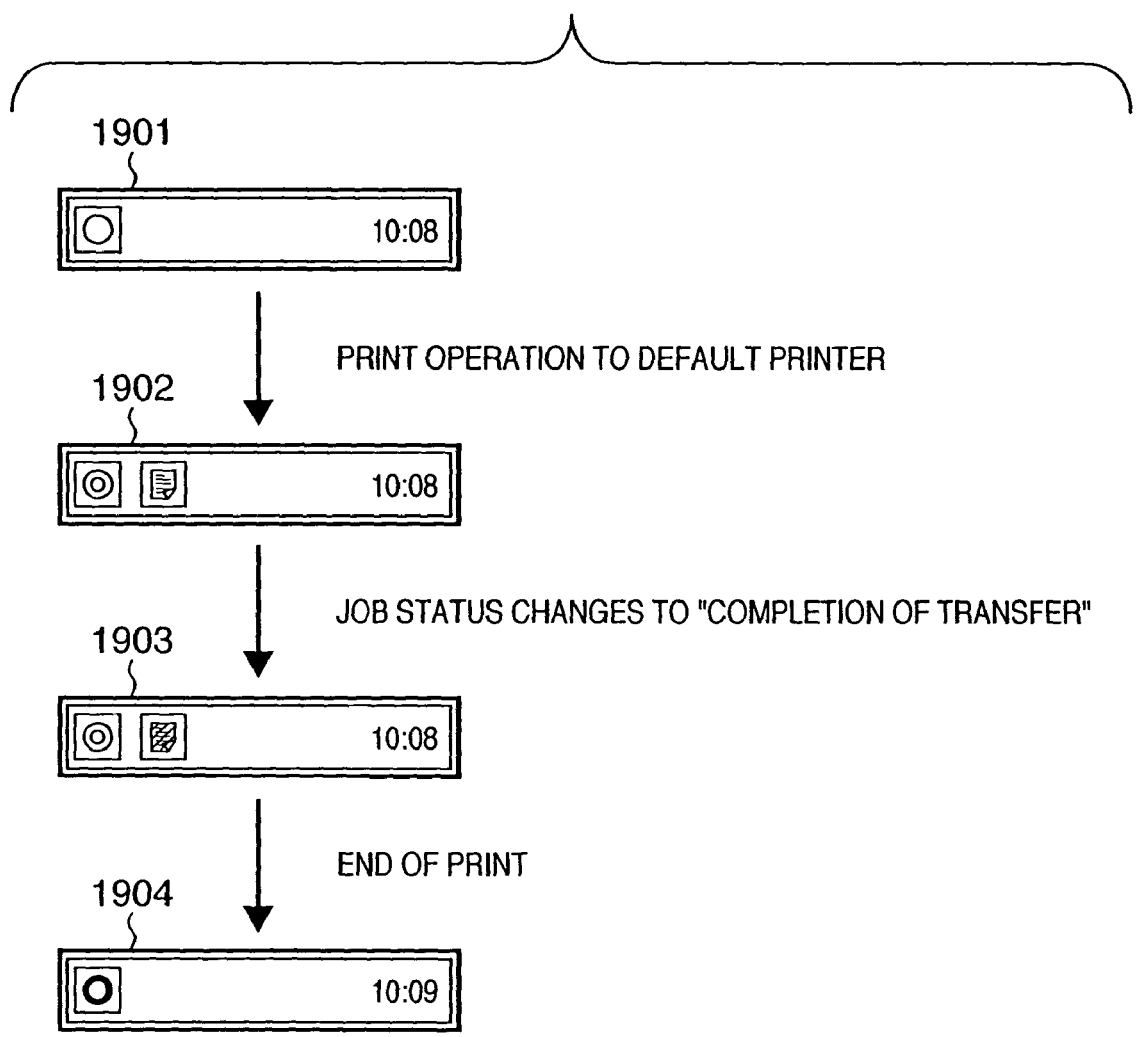
FIG. 19 shows an example of transition of icons displayed on the task tray.

A state 1901 in FIG. 19 indicates an initial display state when the operation mode is the default printer monitor mode in FIG. 9, and the mode that does not monitor the default printer upon launching is set, as in FIG. 18. Therefore, an icon in the initial state indicates a non-monitor state, as indicated by 1501 in FIG. 15A.

After that, since the user of interest inputs a job to the default printer (logical printer), a state 1902 indicates that YES is determined in step S1210 and the flow advances to step S1302 in FIG. 13 to display the state (printable) of the default printer. In the state 1902, since the job of the user of interest is in a state before device transfer (physical printer), the flow advances to step S1704 via step S1703, and a pre-device transfer icon is displayed as the job status monitor icon. Therefore, in the state 1902, the icon 1504 indicating "printable" and the icon 1512 indicating "before completion of transfer" are displayed. When the user double-clicks this icon via the pointing device, the aforementioned normal monitor utility is launched. As a result, the normal monitor utility that allows the user to browse information in more detail than the resident display at the issuance timing of a job can be launched.

The job is transferred to the device, and the flow advances to step S1705 via step S1703. In a state 1903, a device processing icon is in progress (the icon 1513 shown in FIG. 15B) is displayed. Process in progress of the device processing icon is in progress in the state 1903 means "after completion of transfer until end of process". "End" corresponds to reception of an end message from a device which supports a predetermined control language (e.g., LIPS of CANON Inc.), and means that the timing after transfer matches the end timing for devices which do not support such control language.

As for default printer status monitoring operation, since the job of the user of interest is not completed, YES is determined in step S1311, and the flow returns to step S1302, thus continuing the status display. In the example of FIG. 19, the printable state remains unchanged, since the device status remains the same.

Since the print process in the device is complete, NO is determined in step S1701. In a state 1904, the job status monitor icon 1104 is cleared in step S1708. Since the default printer monitor period has elapsed, the flow advances from step S1310 to step S1201 via step S1311. In the state 1904, the default printer monitor mode resident icon 1103 is set in a non-monitor state.

Figure 20:
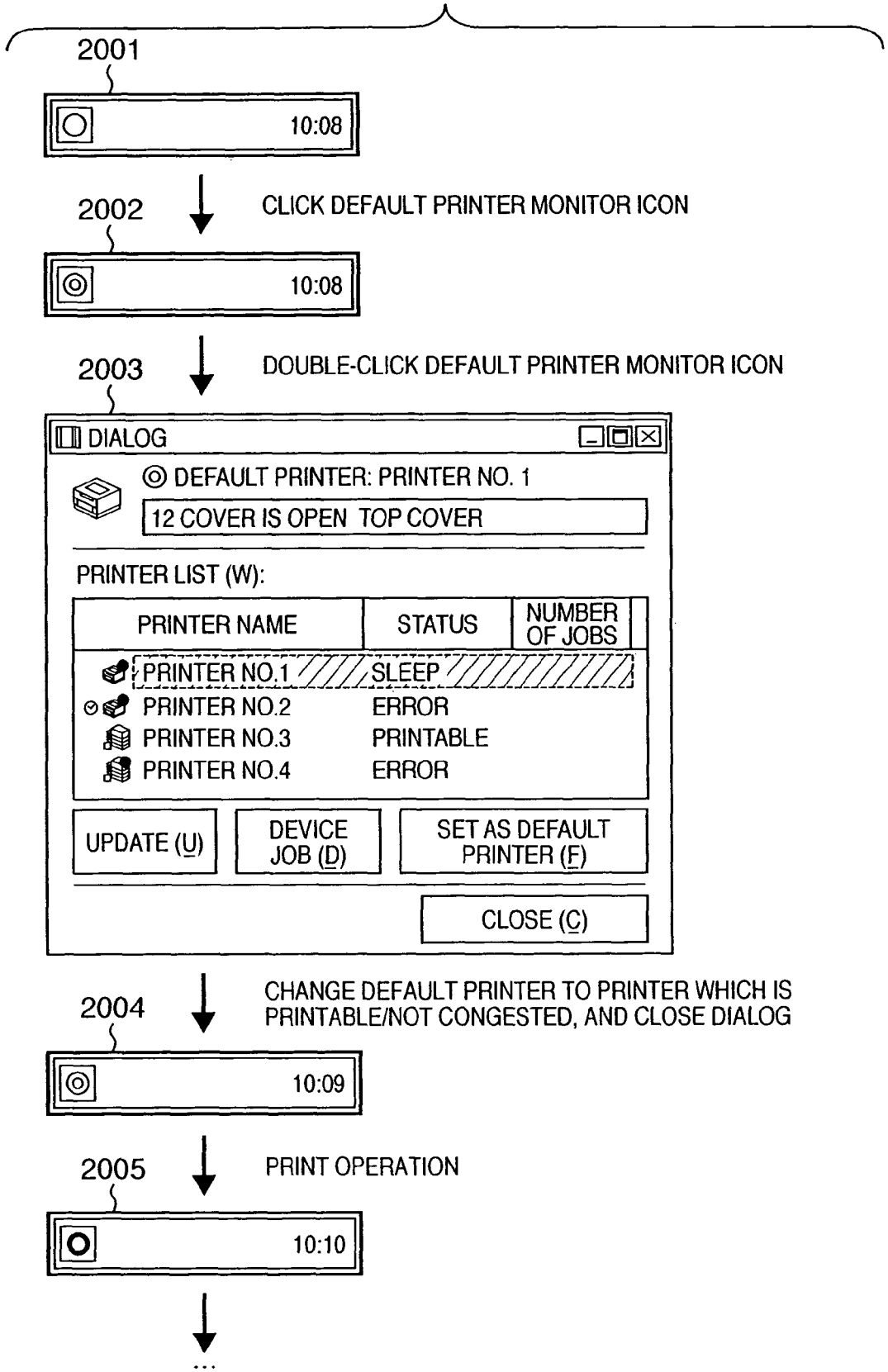
FIG. 20 shows an example of transition of icons displayed on the task tray.

A state 2001 in FIG. 20 indicates an initial display state when the operation mode is the default printer monitor mode in FIG. 9, and the mode that does not monitor the default printer upon launching is set, as in FIGS. 18 and 19.

After that, since the user clicks the default printer monitor mode resident icon 1103, the flow advances from step S1206 to step S1208, and then reaches step S1302. In a state 2002, the status of the default printer is displayed.

Furthermore, since the user double-clicks the default printer monitor mode resident icon 1103, the flow advances from step S1306 to step S1307. In a state 2003, the default printer status display dialog is displayed. In this state, a change instruction to a printer which is printable and is not congested as the default printer is issued in response to an instruction via the pointing device.

Since the user has changed the default printer on the default printer status display dialog, YES is determined in step S1309, and the flow advances to step S208. After the default printer monitor start time is updated in step S1208, the status of the new default printer is displayed in step S1302. A state 2004 indicates this state.

Furthermore, since the user inputs a job to the default printer, the job status monitor icon is added in a state 2005. Since this job is not transferred to the device yet, the flow advances from step S1703 to step S1704, and a pre-device transfer icon is displayed in the state 2005.

According to this embodiment, every time the user wants to detect the status of jobs and printer devices, he or she need not launch a monitor utility application, and can detect the status of jobs and printer devices by a monitor instruction to the resident display. In addition, even in an environment in which a plurality of logical printers are registered in a computer, since the default printer is set as an object to be monitored, the resident display can be displayed on a limited small display region. Therefore, a monitoring scheme that can greatly improve convenience compared to the conventional monitor utility that simultaneously manages status data of a plurality of printers can be implemented.

Furthermore, the monitor module that acquires job and device status data is launched using the resident display icon on, e.g., the task tray, and the status data acquired by the monitor module is reflected on the resident display. Hence, display of other application windows such as a document processing application and the like will never be hidden upon monitoring. Since the job status and device status can be monitored without disturbing display of other application windows, monitoring of jobs and devices before issuance of an arbitrary job can be promoted.

Furthermore, as shown in the flowchart of FIG. 13, since the default printer is monitored not all the time but for a predetermined period of time in response to an instruction to the resident display, the default printer monitoring process at a timing which is not related to a print request is omitted to reduce the network load. Also, the processing load on the printer and client (or server) can be reduced.

Even when the predetermined time has elapsed, monitoring of the default printer is not stopped unconditionally, but monitoring is stopped under the condition that jobs of the self user for the default printer are complete. Hence, the user need not input a monitor instruction of the default printer again, and an unwanted process, i.e., monitoring which is continued even after the print job process of the self user is complete, can be avoided.

Furthermore, since the conventional normal monitor utility that allows the user to browse information of the device and jobs in more detail than the resident display can be launched in addition to the resident display on the task tray, a scheme that can meet the demand of the user who wants to detect detailed information can be provided.

Since the default printer monitoring scheme is implemented, the device in a paper jam or out-of-paper state can be easily recognized in advance, and the control can prompt the user to set another printer as the default printer. Therefore, a print operation with poor efficiency, i.e., re-issuance of a print request to another printer by the user, can be prevented.

The functions of the aforementioned embodiments can also be achieved by supplying a storage medium, which records a program code of a software program to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read but from the storage medium is written in a memory of the extension board or unit.

Note that the above embodiments have been explained based on an example in which a plurality of printers are connected to a client computer via a network. However, the present invention is not limited to such specific example, and the plurality of printers may include a local computer. Also, the network may be a wireless network such as a wireless LAN.

As described above, according to the present invention, the default printer is selected as an object to be monitored, the status of a device corresponding to the default printer is monitored, and the result based on monitoring is displayed as a resident display. Hence, the resident display can be displayed on a limited display region, i.e., the task tray of the Windows, and does not disturb other document creation application windows. Also, since the user need not purposely input an instruction for launching a monitor utility upon printing unlike in the prior art, a job or printer device monitoring scheme, which is very convenient for the user, can be implemented.

As many apparently widely different embodiments of the present invention can be made without departing from the spirit and scope thereof, it is to be understood that the invention is not limited to the specific embodiments thereof except as defined in the claims.

What is claimed is:

1. A computer-readable medium storing, in executable form, a program for operating an information processing apparatus with a print processing function, the program comprising:

program code for executing a default printer specifying step of specifying a default printer, to be used as a default registered in an operating system, when a printing process is performed;

program code for executing a monitoring step of monitoring a status of a first printer that is specified as the default printer;

program code for executing a first control step of controlling to display a first job icon indicating a result of the monitoring of the status of the first printer, in the monitoring step, on a display unit as a resident display;

program code for executing a checking step of checking whether the default printer registered in the operating system has changed from the first printer to a second printer;

program code for executing a changing step of changing a monitoring object in the monitoring step from the first printer to the second printer, in response to a checked result in the checking step that the default printer has changed; and program code for executing a second control step of monitoring a status of the second printer that is specified as the default printer and controlling to display a second job icon indicating a result of the monitoring of the status of the second printer, wherein, in the second control step, the first job icon displayed on the display unit as the resident display is changed to the second job icon.

2. The computer-readable medium according to claim 1, wherein the default printer is a logical printer, and the program code for executing the monitoring step includes program code for monitoring a physical printer corresponding to the logical printer.

3. The computer-readable medium according to claim 1, wherein the program further comprises program code for executing a process switching step of switching processing operations to be executed in correspondence with types of instructions to the resident display.

4. The computer-readable medium according to claim 3, wherein the processing operations include a default printer change setup window display process, and a default printer monitor process.

5. The computer-readable medium according to claim 1, wherein the program code for executing the monitoring step includes program code for monitoring a status of the default printer upon launching in response to a change from the first printer to the second printer.

6. The computer-readable medium according to claim 1, wherein the program code for executing the monitoring step includes program code for monitoring the default printer for a predetermined period of time when a first instruction is made for the resident display.

7. The computer-readable medium according to claim 6, wherein the program further comprises:

program code for executing a determination step of determining, based on a presence or an absence of a job, whether monitoring is to end in response to an elapse of the predetermined period of time, and wherein the program code for executing the monitoring step includes program code for ending monitoring of the default printer based on a determination result in the determination step.

8. The computer-readable medium according to claim 7, wherein the presence or the absence of a job is determined based on a job of a first user, and the status of the default printer reflected on the resident display is a status of a physical printer corresponding to the default printer based on a job of a second user.

9. The computer-readable medium according to claim 1, wherein monitoring of the default printer starts, or ends, or both starts and ends based on a job of a first user, and the status of the default printer reflected on the resident display is a status of a physical printer corresponding to the default printer based on a job of a second user.

10. The computer-readable medium according to claim 1, wherein a monitoring operation in the monitoring step can be launched irrespective of the presence or the absence of a print request.

11. The computer-readable medium according to claim 1, wherein the program code for executing the first control step includes program code for launching a monitor utility that displays statuses of a plurality of printers and a status of a job in each printer in addition to the resident display.

12. The computer-readable medium according to claim 1, further comprising program code for executing a job status monitoring step of determining a presence or an absence of a job that is undergoing a print process in the default printer, and displaying, when the job is determined to be present, a job icon indicating a status of the job as another resident display on the display unit parallel to the resident display.

13. An information processing method performed by an information processing apparatus with a print processing function, the method comprising:
- a default printer specifying step of specifying a default printer to be used as a default registered in an operating system, when a printing process is performed;
- a monitoring step of monitoring a status of a first printer that is specified as the default printer;
- a first control step of controlling to display a first job icon indicating a result of the monitoring of the status of the first printer, in the monitoring step, on a display unit as a resident display;
- a checking step of checking whether the default printer registered in the operating system has changed from the first printer to a second printer; and
- a changing step of changing a monitoring object in the monitoring step from the first printer to the second printer, in response to a detection in the checking step that the default printer has changed; and
- a second control step of monitoring a status of the second printer that is specified as the default printer and controlling to display a second job icon indicating a result the monitoring of the status of the second printer, wherein, in the second control step, the first job icon displayed on the display unit as the resident display is changed to the second job icon.

14. The method according to claim 13, wherein the default printer is a logical printer, and the monitoring step includes a step of monitoring a physical printer corresponding to the logical printer.

15. The method according to claim 13, further comprising a process switching step of switching processing operations to be executed in correspondence with types of instructions to the resident display.

16. The method according to claim 15, wherein the processing operations include a default printer change setup window display process, and a default printer monitor process.

17. The method according to claim 13, wherein the monitoring step includes a step of monitoring a status of the default printer upon launching in response to a change from the first printer to the second printer.

18. The method according to claim 13, wherein the monitoring step includes a step of monitoring the default printer for a predetermined period of time when a first instruction is made for the resident display.

19. The method according to claim 18, further comprising:
- a determination step of determining, based on a presence or an absence of a job, whether monitoring is to end in response to an elapse of the predetermined period of time,
- wherein the monitoring step includes a step of ending monitoring of the default printer based on a determination result in the determination step.

20. The method according to claim 19, wherein the presence or the absence of a job is determined based on a job of a first user, and the status of the default printer reflected on the resident display is a status of a physical printer corresponding to the default printer based on a job of a second user.

21. The method according to claim 13, wherein monitoring of the default printer starts, or ends, or both starts and ends based on a job of a first user, and the status of the default printer reflected on the resident display is a status of a physical printer corresponding to the default printer based on a job of a second user.

22. The method according to claim 13, wherein a monitoring operation in the monitoring step can be launched irrespective of the presence or the absence of a print request.

23. The method according to claim 13, wherein the first control step includes a step of launching a monitor utility that can display status data of a plurality of printers and status data of jobs in each printer in addition to the resident display.

24. The method according to claim 13, further comprising a job status monitoring step of determining a presence or an absence of a job that is undergoing a print process in the default printer, and displaying, when the job is determined to be present, a job icon indicating a status of the job as another resident display on the display unit parallel to the resident display.

25. An information processing apparatus with a print processing function, comprising:
- default printer specifying means for specifying a default printer to be used as a default registered in an operating system, when a printing process is performed;
- monitoring means for monitoring a status of the default printer;
- first control means for controlling to display a first job icon indicating a result of the monitoring of the status of the first printer, by the monitoring means, on a display unit as a resident display;
- checking means for checking whether the default printer registered in the operating system has changed from a first printer to a second printer;
- changing means for changing a monitoring object of the monitoring means from the first printer to the second printer, in response to a detection by the checking means that the default printer has changed; and
- second control means for monitoring a status of the second printer that is specified as the default printer and for controlling to display a second job icon indicating a result of the monitoring of the second printer, wherein the second control means changes the first job icon displayed on the display unit as the resident display to the second job icon.

* * * * *